United States Patent
Chang et al.

(10) Patent No.: US 9,239,625 B2
(45) Date of Patent: Jan. 19, 2016

(54) MOBILE TERMINAL AND CONTROL METHOD THEREOF

(71) Applicant: LG ELECTRONICS INC., Seoul (KR)

(72) Inventors: Minkyoung Chang, Seoul (KR); Yunmi Kwon, Seoul (KR); Arim Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 13/687,893

(22) Filed: Nov. 28, 2012

(65) Prior Publication Data

US 2014/0035946 A1 Feb. 6, 2014

(30) Foreign Application Priority Data

Aug. 3, 2012 (KR) .................. 10-2012-0085013

(51) Int. Cl.
*G06F 3/01* (2006.01)
*G06F 3/0488* (2013.01)

(52) U.S. Cl.
CPC ............ *G06F 3/017* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2010/0053111 A1* | 3/2010 | Karlsson .................. | 345/174 |
| 2010/0192109 A1* | 7/2010 | Westerman et al. ......... | 715/863 |
| 2010/0279738 A1* | 11/2010 | Kim et al. .................. | 455/566 |
| 2011/0069019 A1 | 3/2011 | Carpendale et al. | |
| 2011/0209101 A1* | 8/2011 | Hinckley et al. ............. | 715/863 |
| 2012/0026100 A1* | 2/2012 | Migos et al. .................. | 345/173 |
| 2012/0180002 A1* | 7/2012 | Campbell et al. ............. | 715/863 |
| 2012/0306769 A1* | 12/2012 | Zhu et al. ..................... | 345/173 |

FOREIGN PATENT DOCUMENTS

EP 2 407 869 1/2012

OTHER PUBLICATIONS

Hinckley, Ken, and Hyunyoung Song. "Sensor synaesthesia: touch in motion, and motion in touch." Proceedings of the SIGCHI Conference on Human Factors in Computing Systems. ACM, 2011.*
Gordon, Whitson. "Pinch to Get an Overview of All Your Android Home Screens." 2011.*
"Samsung Galaxy SII Mobile Phone User Manual." Samsung Telecommunications America, LLC, 2011.*
Extended European Search Report for Application 13164855.2 dated Dec. 10, 2013.

* cited by examiner

*Primary Examiner* — Maurice L McDowell, Jr.
(74) *Attorney, Agent, or Firm* — Ked & Associates, LLP

(57) ABSTRACT

A mobile terminal and a control method thereof are provided. The mobile terminal includes a display and a controller configured to change display of at least one object on the basis of at least one of the attribute of the at least one object and the attribute of a second touch when the second touch applied to at least one point of the display is input while a first touch applied to the at least one object displayed on the display is maintained. Accordingly, display of a selected object can be changed on the basis of at least one of the attribute of the object and the attribute of touch.

19 Claims, 42 Drawing Sheets

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0085013, filed on 3 Aug. 2012, the contents of which are incorporated by reference herein in their entirety.

TECHNICAL FIELD

The present invention relates to a mobile terminal and, more particularly, to a mobile terminal and a control method thereof for changing display of an object selected on the basis of at least one of an object attribute and a touch attribute.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

As a terminal is widely used, user's demands for easy edition of displayed objects increase.

SUMMARY

The present invention relates to a mobile terminal and a control method thereof for changing display of an object selected on the basis of at least one of an object attribute and a touch attribute.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 38 and 39 illustrate a calculation procedure using a chart in the mobile terminal of FIG. 4;

FIG. 40 illustrates a sheet moving procedure using a chart in the mobile terminal of FIG. 4.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
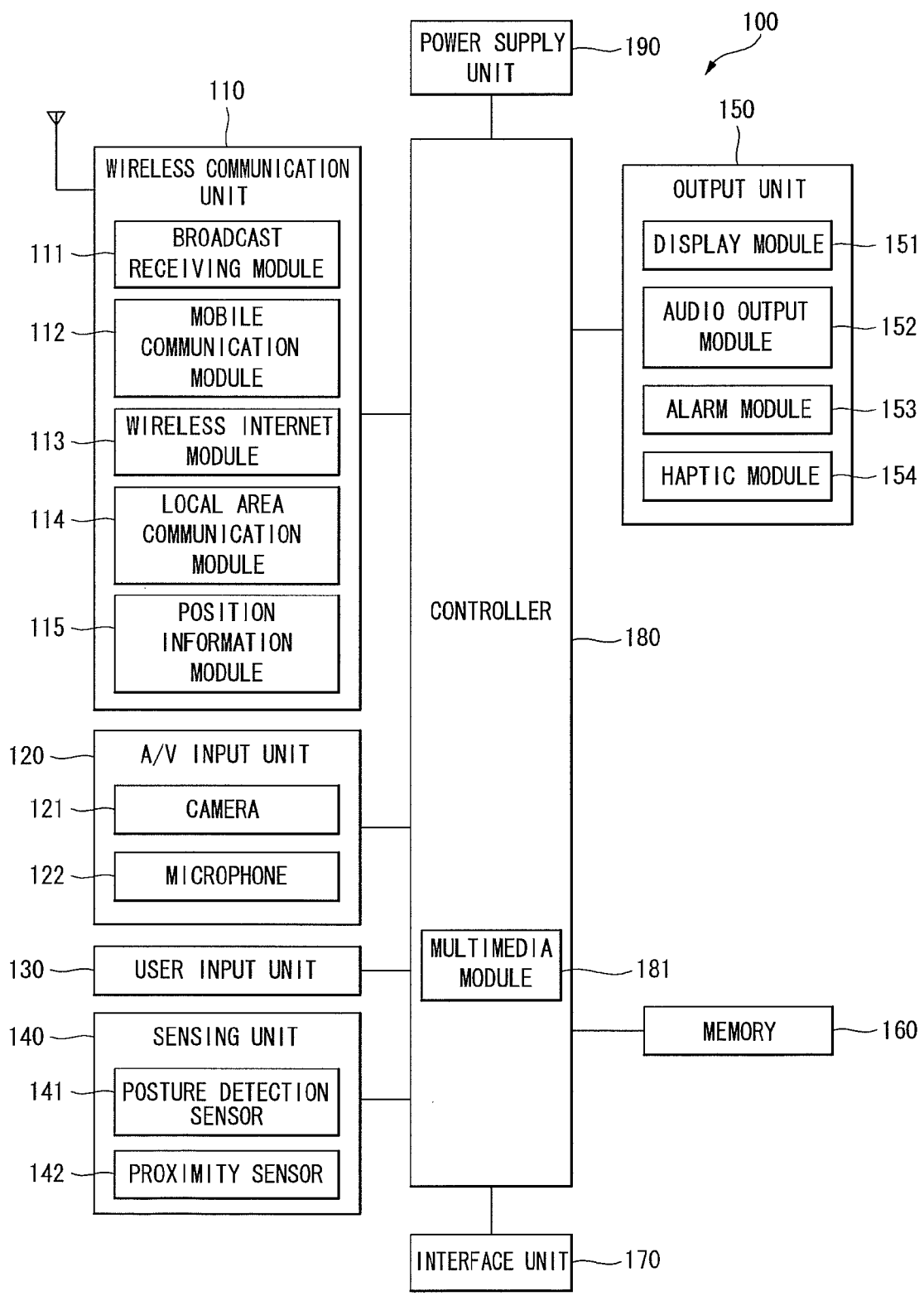
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
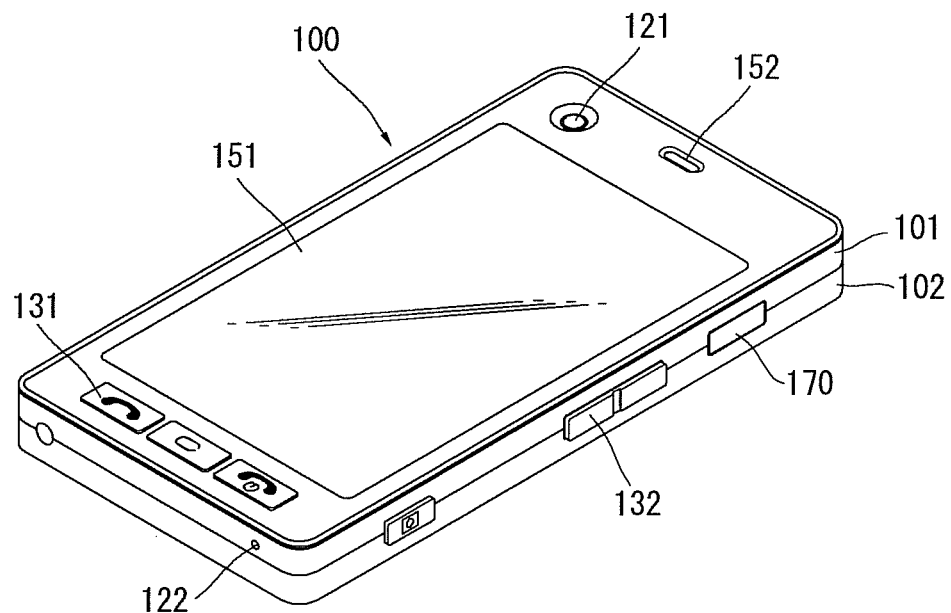
FIG. 2A is a front perspective view of the mobile terminal according to an embodiment.

FIG. 2A is a front perspective view of a mobile terminal (or a handheld terminal) according to an embodiment.

The mobile terminal 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the mobile terminal 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display 151, the audio output unit 152, the camera 121, the user input unit 130/131 and 132, the microphone 122 and the interface 170 may be arranged (or provided) in the terminal body, and more specifically may be arranged (or provided) in the front case 101.

The display 151 may occupy most of the main face of the front case 101. The audio output unit 152 and the camera 121 may be arranged in a region in proximity to one of both ends of the display 151 and the user input unit 131, and the microphone 122 may be located in a region in proximity to another end of the display 151. The user input unit 132 and the interface 170 may be arranged (or provided) on sides of the front case 101 and the rear case 102.

The user input unit 130 may receive commands for controlling operation of the mobile terminal 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display 151 to a touch recognition mode.

Figure 2B:
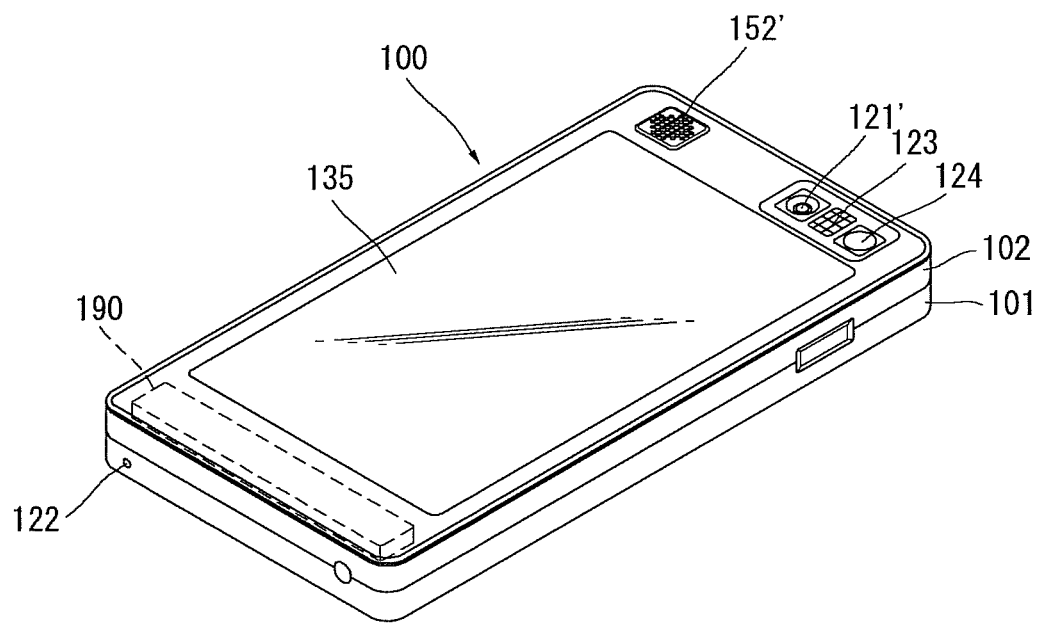
FIG. 2B is a rear perspective view of the mobile terminal according to an embodiment.

FIG. 2B is a rear perspective view of the mobile terminal (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcasting receiving module 111 (shown in FIG. 1) may be set in the terminal body such that the antenna may be pulled out of the terminal body.

The power supply 190 for providing power to the mobile terminal 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display 151. In this example, if the display 151 outputs visual information through both sides thereof, the visual information may be recognized (or determined) by the touch pad 135. The information output through both sides of the display 151 may be controlled by the touch pad 135. Otherwise, a display may be additionally attached (or provided) to the touch pad 135 such that a touch screen may be arranged (or provided) even in the rear case 102.

The touch pad 135 may operate in connection with the display 151 of the front case 101. The touch pad 135 may be located in parallel with the display 151 behind the display 151. The touch panel 135 may be identical to or smaller than the display 151 in size.

Figure 3:
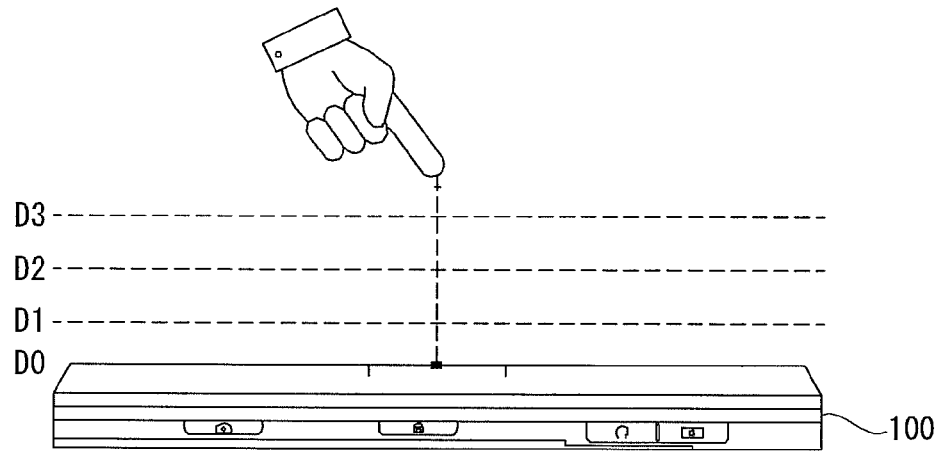
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touch screen, the proximity sensor located inside or near the touch screen may sense the approach of the pointer, and may output a proximity signal.

The proximity sensor may be constructed such that the proximity sensor outputs a proximity signal according to a distance between the pointer approaching the touch screen and the touch screen (referred to as "proximity depth").

The distance in which the proximity signal is output when the pointer approaches the touch screen may be referred to as a detection distance. The proximity depth may be determined by using a plurality of proximity sensors having different detection distances and by comparing proximity signals respectively output from the proximity sensors.

FIG. 3 shows a section of the touch screen in which proximity sensors capable of sensing three proximity depths may be provided. Proximity sensors capable of sensing less than three or more than four proximity depths may be provided in the touch screen.

More specifically, when the pointer completely contacts the touch screen (D0), it may be recognized as contact touch. When the pointer is located within a distance D1 from the touch screen, it may be recognized as a proximity touch of a first proximity depth. When the pointer is located in a range between the distance D1 and a distance D2 from the touch screen, it may be recognized as a proximity touch of a second proximity depth. When the pointer is located in a range between the distance D2 and a distance D3 from the touch screen, it may be recognized as a proximity touch of a third proximity depth. When the pointer is located greater than the distance D3 from the touch screen, it may be recognized as cancellation of the proximity touch.

Accordingly, the controller 180 may recognize the proximity touch as various input signals according to proximity distance and proximity position of the pointer with respect to the touch screen, and the controller 810 may perform various operation controls according to the input signals.

Figure 4:
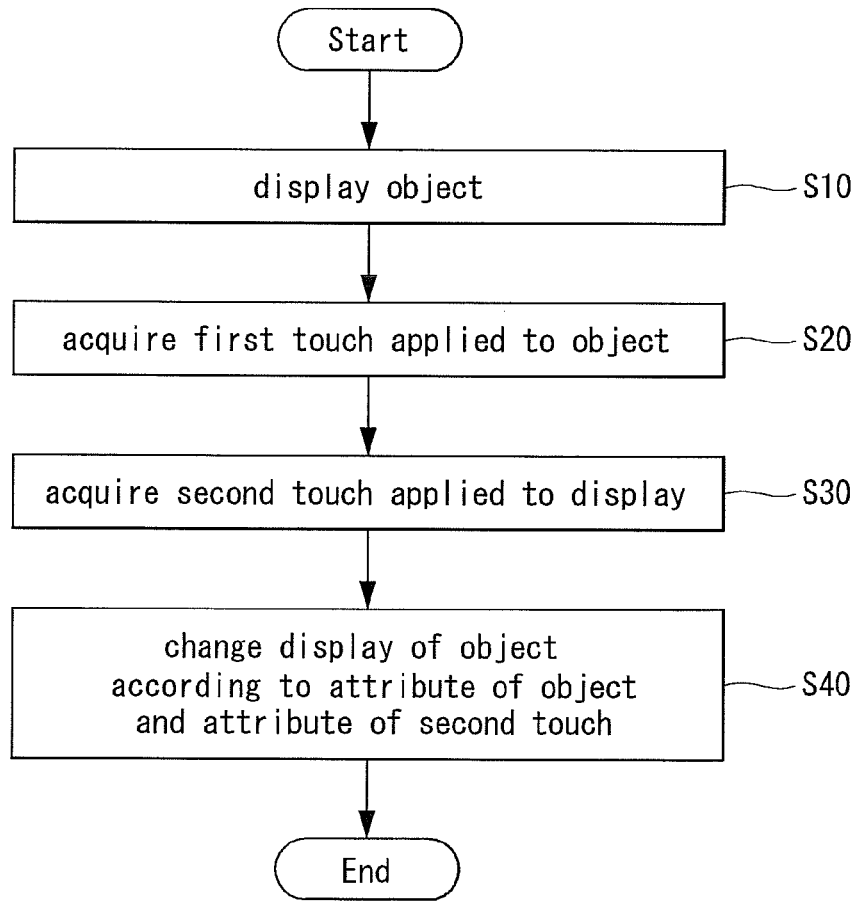
FIG. 4 is a flowchart illustrating operations of a mobile terminal according to an embodiment of the present invention.

FIG. 4 is a flowchart illustrating operations of a mobile terminal according to an embodiment of the present invention.

As shown in FIG. 4, the controller 180 of the mobile terminal 100 according to an embodiment of the present invention may display an object (S10).

The object may be displayed on the display 151 and visually recognized by a user. There may be various objects. For example, an object can be a video and/or a still image captured by the camera 121, or a video and/or a still image acquired from an external device. Otherwise, the object may be content generated by the user of the mobile terminal 100. That is, the object may be a figure, a picture, a character or the like input by the user.

An object may be displayed on the display 151 on the basis of operation of the user and/or control operation of the controller 180. For example, the user can select content and display the selected content on the display. At the instant the content is displayed, the content can be regarded as a visually recognizable object.

When the object is displayed, a first touch applied to the object may be acquired (S20).

The first touch may be a touch operation performed on the displayed object. For example, the first touch can be an operation of touching an area in which the object is displayed with a finger. In this case, the touch operation may be an operation of touching a point in the area in which the object is displayed and holding the touch.

The first touch may be a series of touch operations simultaneously or sequentially performed. For example, when a plurality of objects are displayed, the first touch can be operations of touching a first object with a first finger and touching a second object with a second finger while maintaining the touch applied to the first object. Otherwise, the first touch can be an operation of touching the second object within a predetermined time after touch of the first object is ended.

A second touch applied to the display 151 may be acquired (S30).

The second touch may be different from the first touch. For example, the second touch can be a touch operation performed on the outside of the area in which the object is displayed. The second touch may be various types of touch operations. For example, the second touch can include short touch applied to a specific point, long touch applied to a specific point, drag touch, flicking touch, double touch applied to a specific point, double touch simultaneously applied to two points.

Display of the object may be changed according to the attribute of the object and the attribute of the second touch (S40).

The controller 180 can change display of the object. For example, the controller 180 can change at least one of the position, size and color of the object. Otherwise, the controller 180 can cancel display of the object.

Change of display of the object may be determined according to at least one of the attribute of the object and the attribute of the second touch. For example, display of the object can be changed according to which object is selected by the first touch or according to the second touch following the first touch that specifies the object.

Figure 5:
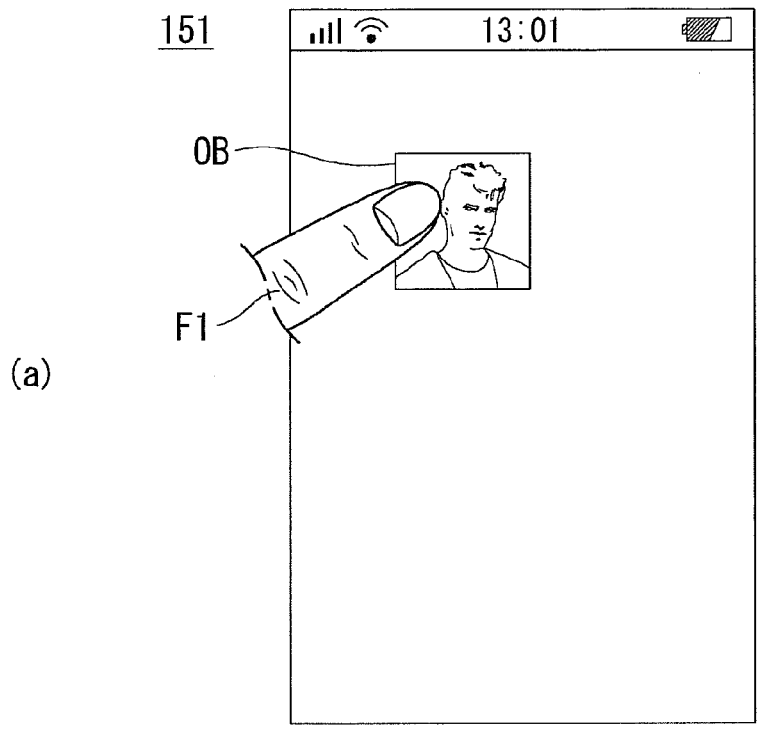
FIGS. 5 to 7 illustrate an operation of the mobile terminal shown in FIG. 4.
Figure 5:
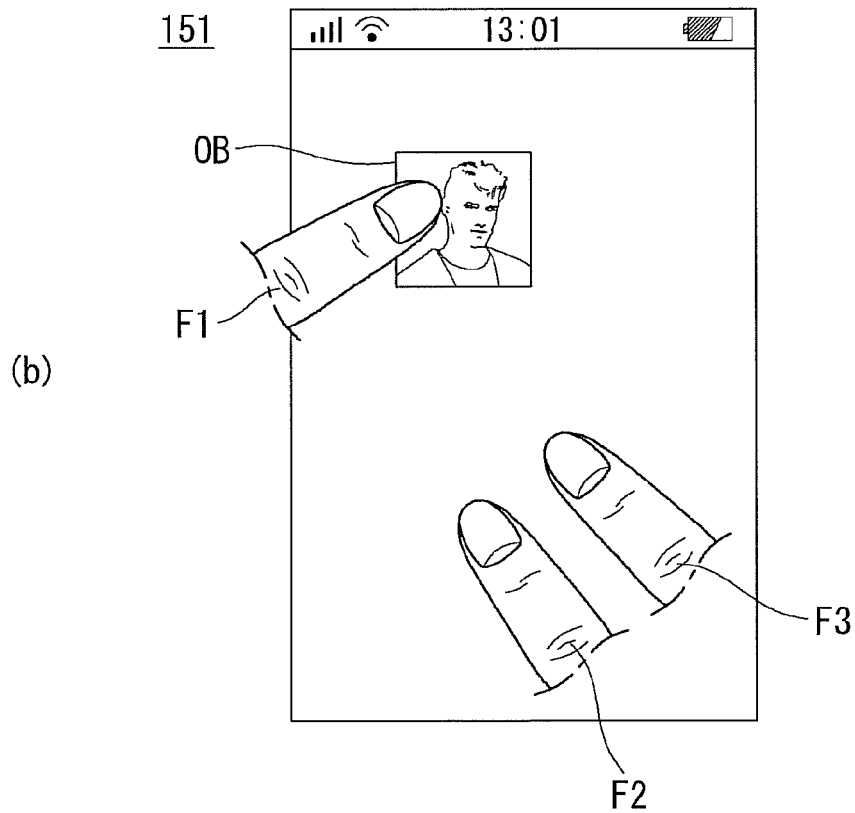
Figure 6:
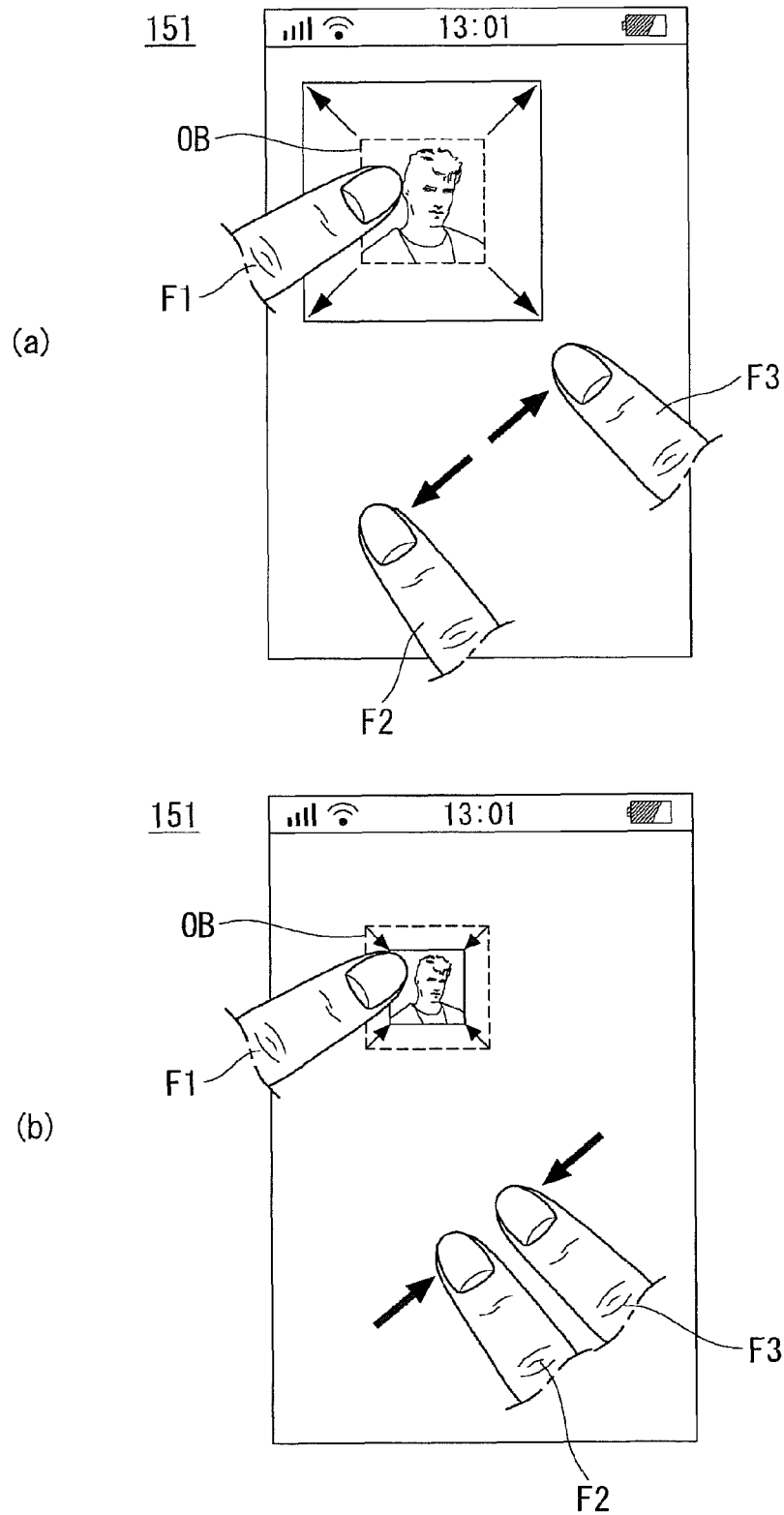
Figure 7:
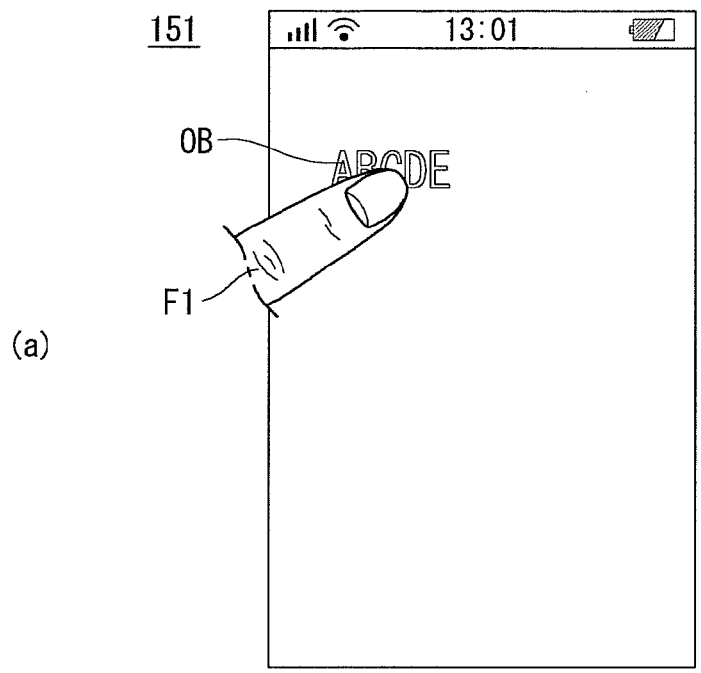
Figure 7:
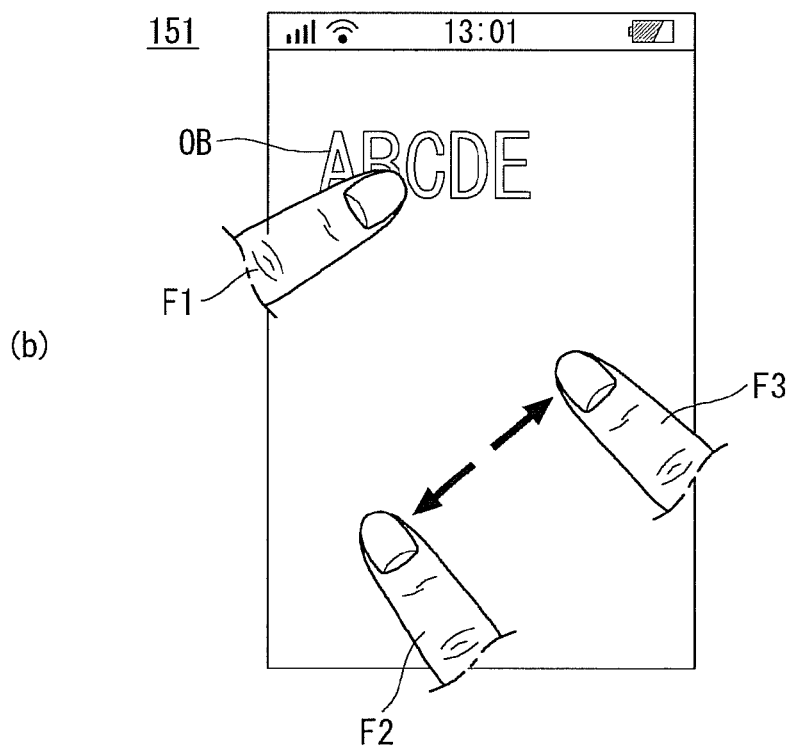

FIGS. 5 to 7 illustrate operations of the mobile terminal shown in FIG. 4.

As shown in FIGS. 5 to 7, the controller 180 of the mobile terminal 100 can change display of an object selected according to a touch operation of a user.

Referring to FIG. 5(a), an object OB may be displayed on the display 151. For example, the object OB can be a specific image. The object OB can be displayed in a specific application being executed. For example, an application for editing data for a presentation may be being executed.

A first touch may be applied to the displayed object OB using a first finger F1. For example, the user can touch a specific point in the displayed object OB with the first finger F1.

Referring to FIG. 5(b), the user may apply a second touch to a specific point of the display 151 using second and third fingers F2 and F3 while maintaining the first touch applied to the object OB. As described above, the second touch may be a touch operation performed on a specific point outside the area in which the object OB is displayed.

Referring to FIGS. 6(a) and 6(b), drag touch may be performed in such a manner that the second and third fingers F2 and F3 that performed the second touch become apart from each other or close to each other.

The controller 180 may change display of the object OB in response to drag of the second touch. The controller 180 can change display of the object OB on the basis of the attribute of the object OB and the attribute of the second touch. For example, if the object OB has an image attribute and the second touch has a drag touch attribute, the controller 180 can change the size of the image corresponding to the object OB in the direction of the drag touch. If the second and third fingers F2 and F3 performing the second touch are dragged in a direction in which the second and third fingers F2 and F3 become apart from each other, the size of the object OB can be increased. That is, the controller 180 can change the size of the object OB on the basis of the attribute of the object OB corresponding to an image and the attribute of the second touch corresponding to dragging two fingers in a direction in which the fingers become apart from each other.

Referring to FIG. 7(a), the user can perform a first touch for selecting an object OB with the first finger F1.

Referring to FIG. 7(b), the user can perform a second touch using the second and third fingers F2 and F3 while maintaining the first touch. The controller 180 can change the size of the object OB in response to the second touch. For example, the controller 180 can increase the size of the object OB when the second touch corresponds to multiple touches that become apart from each other.

Figure 8:
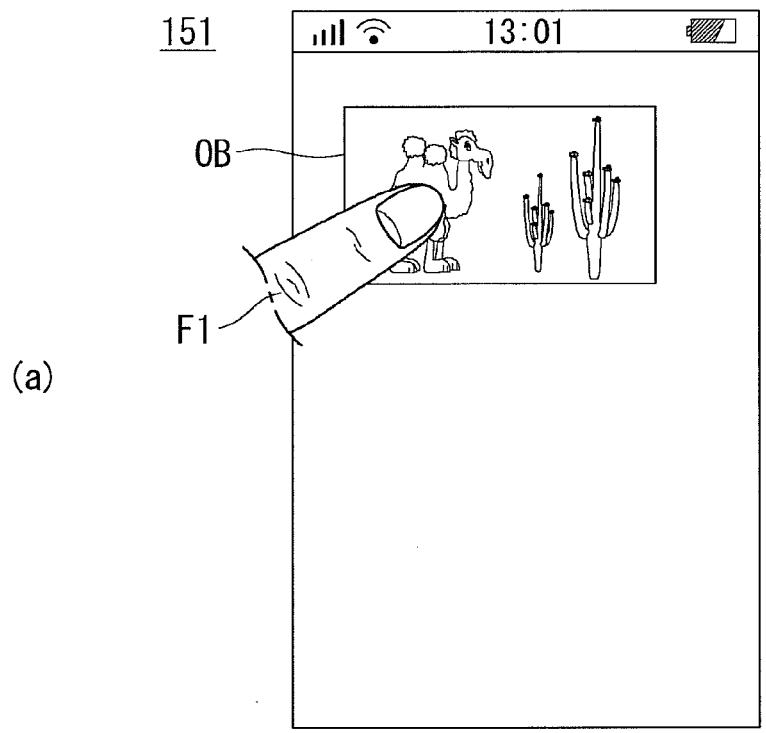
FIG. 8 illustrates another operation of the mobile terminal shown in FIG. 4.
Figure 8:
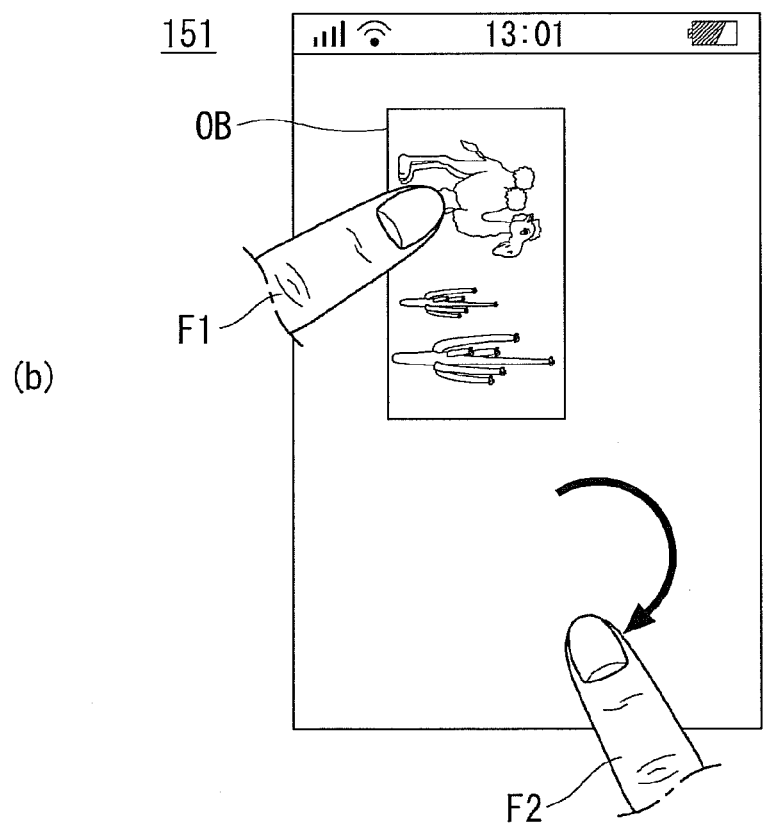

FIG. 8 illustrates a different operation of the mobile terminal shown in FIG. 4.

As shown in FIG. 8, the controller 180 of the mobile terminal 100 can rotate an object OB according to the attribute of the object OB and the attribute of the second touch.

Referring to FIG. 8(a), the user can select the object OB corresponding to an image using the first finger F1.

Referring to FIG. 8(b), the user can apply the second touch to the display 151 with the second finger F2 while maintaining the first touch applied to the object OB. The second touch may be a drag touch rotating in a specific direction on the display 151. For example, the second touch can be a clockwise drag touch operation.

When the second touch corresponding to the clockwise drag touch operation is applied, the controller 180 can rotate the object OB in the direction of the second touch. That is, the controller 180 can rotate the displayed image corresponding to the object OB on the basis of the attribute of the object, i.e., image content, and the attribute of the second touch, i.e., rotating direction.

Figure 9:
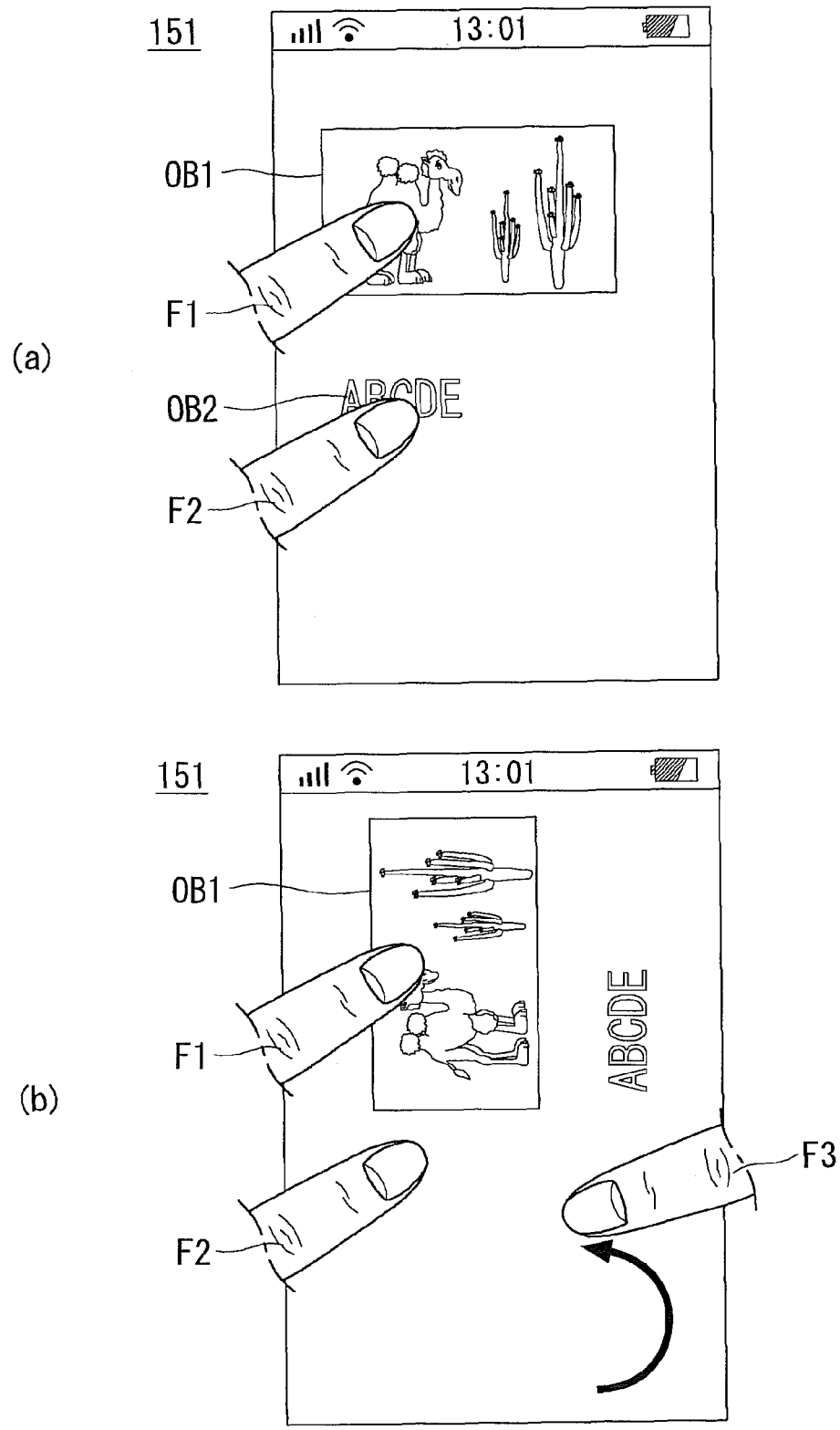
FIGS. 9 and 10 illustrate a procedure of selecting a plurality of objects in the mobile terminal shown in FIG. 4.
Figure 10:
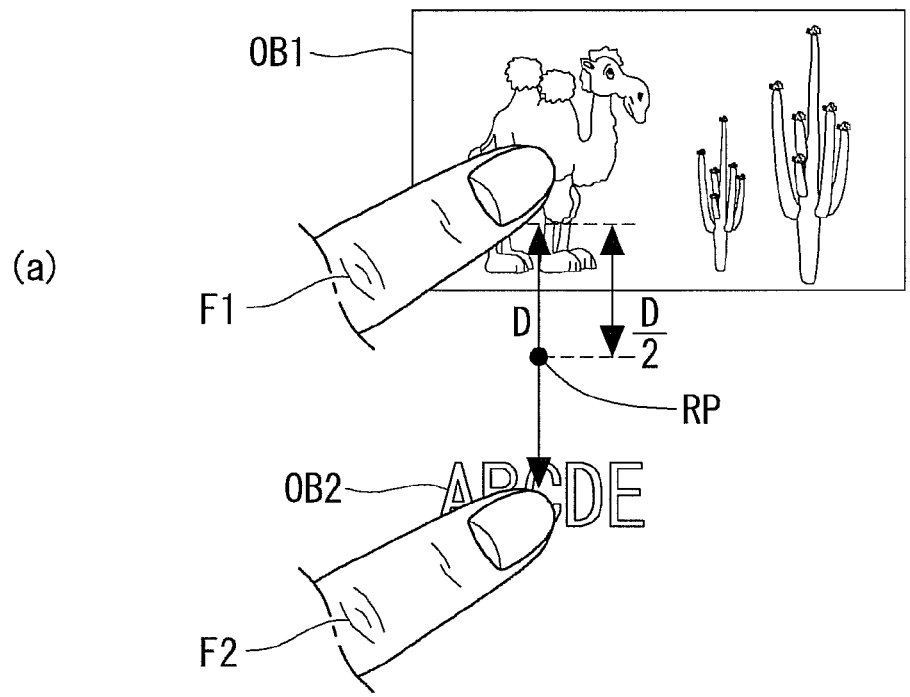
Figure 10:
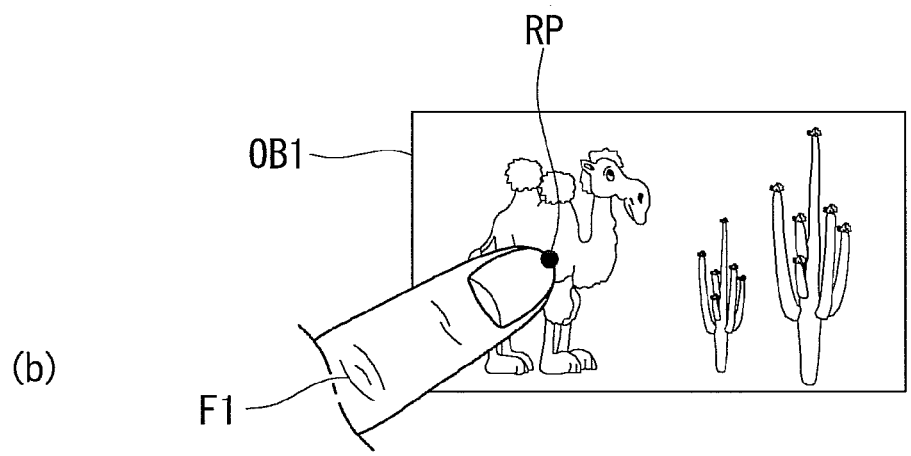

FIGS. 9 and 10 illustrate a procedure of selecting a plurality of objects in the mobile terminal, shown in FIG. 4.

As shown in FIGS. 9 and 10, the controller 180 of the mobile terminal 100 can select a plurality of objects OB1 and OB2 by applying a first touch to the objects OB1 and OB2.

Referring to FIG. 9(a), the plurality of objects can be first and second objects OB1 and OB2. The user can apply the first touch in such a manner that first and second fingers F1 and F2 touch the first and second objects OB1 and OB2. Touches using the first and second fingers F1 and F2 may be performed sequentially or simultaneously.

Referring to FIG. 9(b), the user can apply a second touch using a third finger F3 counterclockwise while maintaining the first touch applied to the first and second objects OB1 and OB2. The controller 180 can rotate the first and second objects OB1 and OB2 in response to the second touch.

Referring to FIG. 10(a), the rotation point RP of the first and second objects OB1 and OB2 may correspond to the middle point of the distance between the first and second fingers F1 and F2. That is, if the distance between the first and second fingers F1 and F2 is D, the first and second objects OB1 and OB2 can rotate on a point corresponding to D/2.

Referring to FIG. 10(b), the first and second objects OB1 and OB2 can rotate on one of the first and second fingers F1 and F2. For example, the rotation point RP can correspond to the point touched by the first finger F1.

Figure 11:
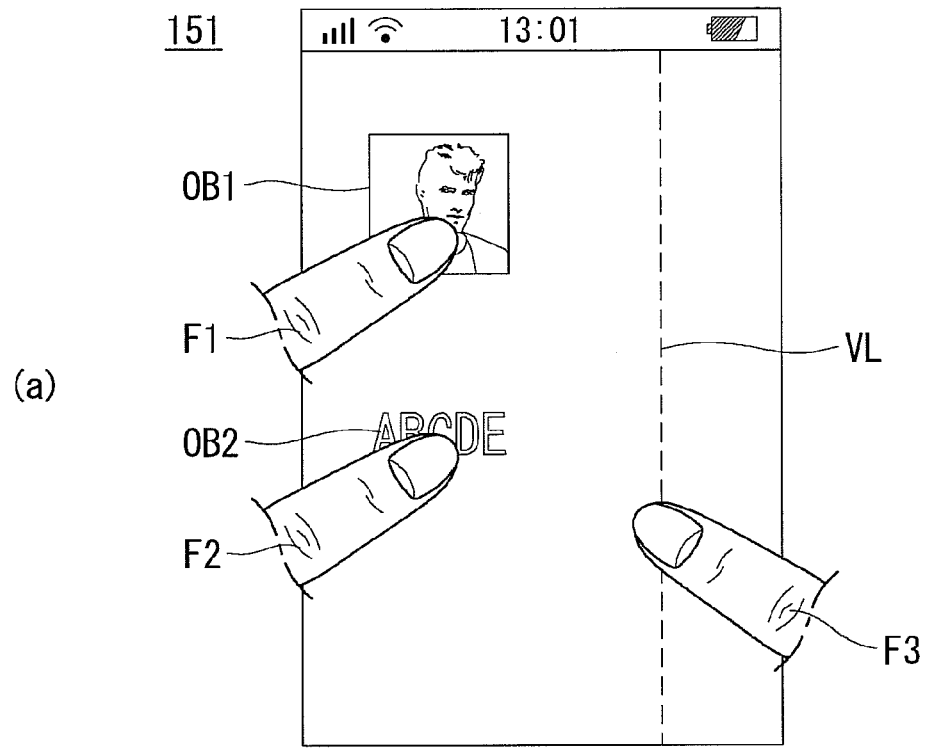
FIGS. 11 and 12 illustrate a procedure of aligning objects in the mobile terminal shown in FIG. 4.
Figure 11:
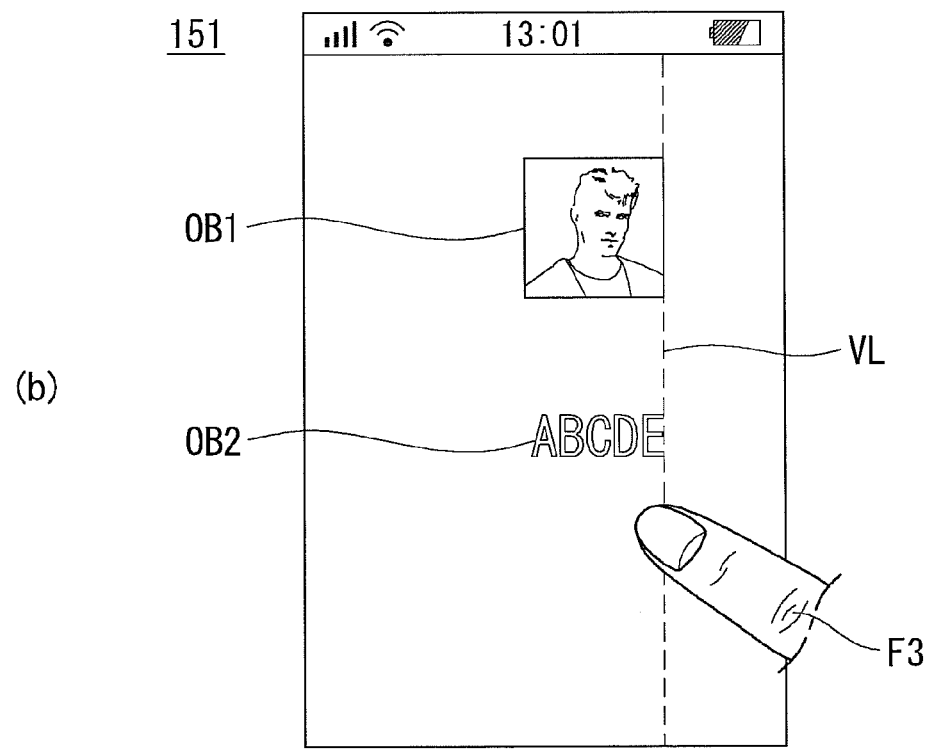
Figure 12:
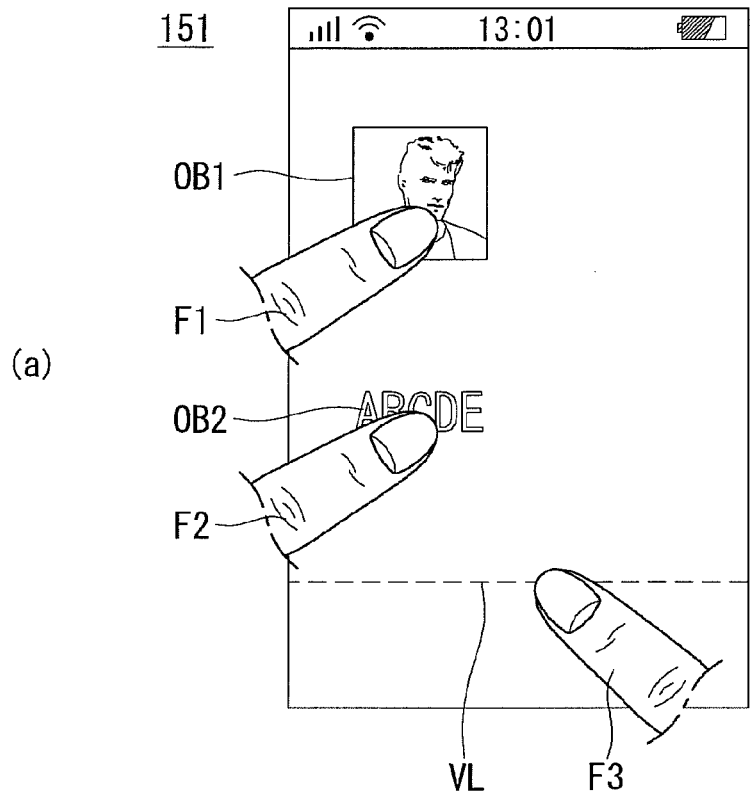
Figure 12:
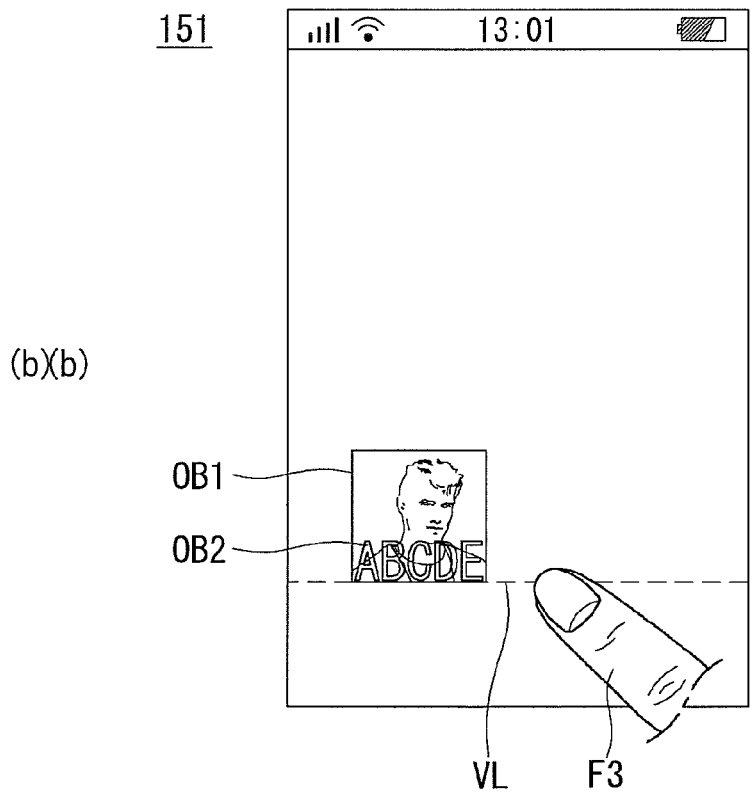

FIGS. 11 and 12 illustrate a procedure of aligning objects in the mobile terminal, shown in FIG. 4.

AS shown in FIGS. 11 and 12, the controller 180 of the mobile terminal 100 can arrange objects according to the second touch.

Referring to FIG. 11(a), the user can apply a first touch in such a manner that first and second fingers F1 and F2 touch first and second objects OB1 and OB2. Then, the user can apply a second touch to a specific point using a third finger F3. The controller 180 can set a virtual line VL on the point to which the second touch is applied. The virtual line VL may be represented as a dotted line, for example, such that the user can visually recognize the virtual line VL.

Referring to FIG. 11(b), the controller 180 can arrange the first and second objects OB1 and OB2 along the virtual line VL. It is possible to arrange the objects only by user touch without an additional operation, and thus the user can effectively manipulate the mobile terminal 100.

Referring to FIG. 12(a), the user can apply a third touch to the display 151 using a third finger while maintaining the first touch applied to the first and second objects OB1 and OB2.

Referring to FIG. 12(b), the controller 180 can arrange the first and second objects OB1 and OB2 along a virtual line VL set on the point to which the second touch is applied.

Figure 13:
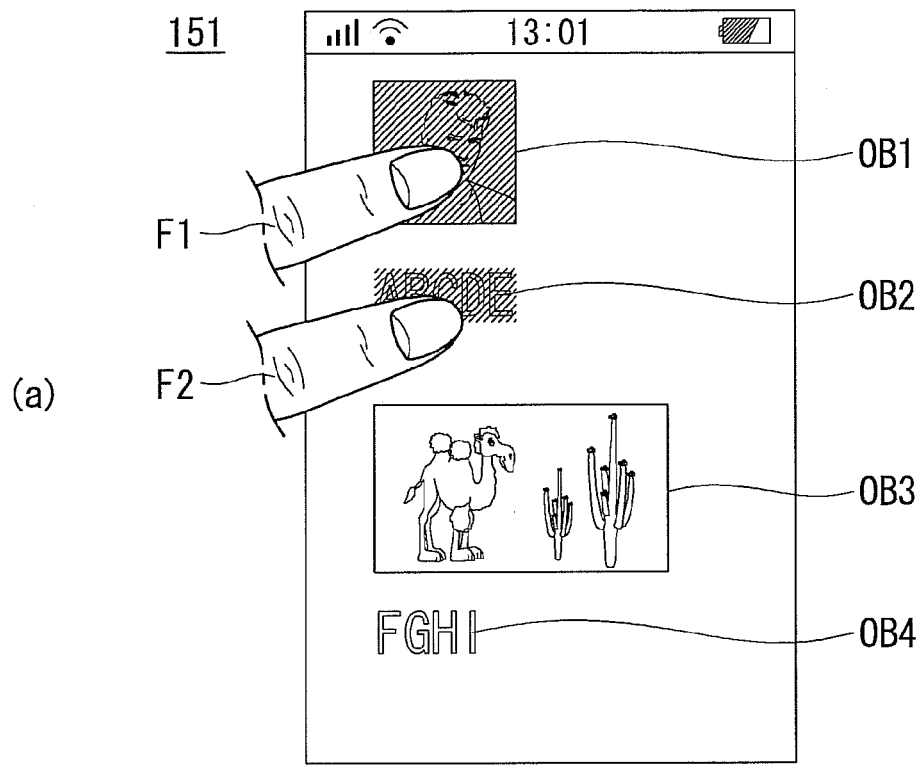
FIGS. 13 to 15 illustrate a procedure of selecting a plurality of objects in the mobile terminal of FIG. 4.
Figure 13:
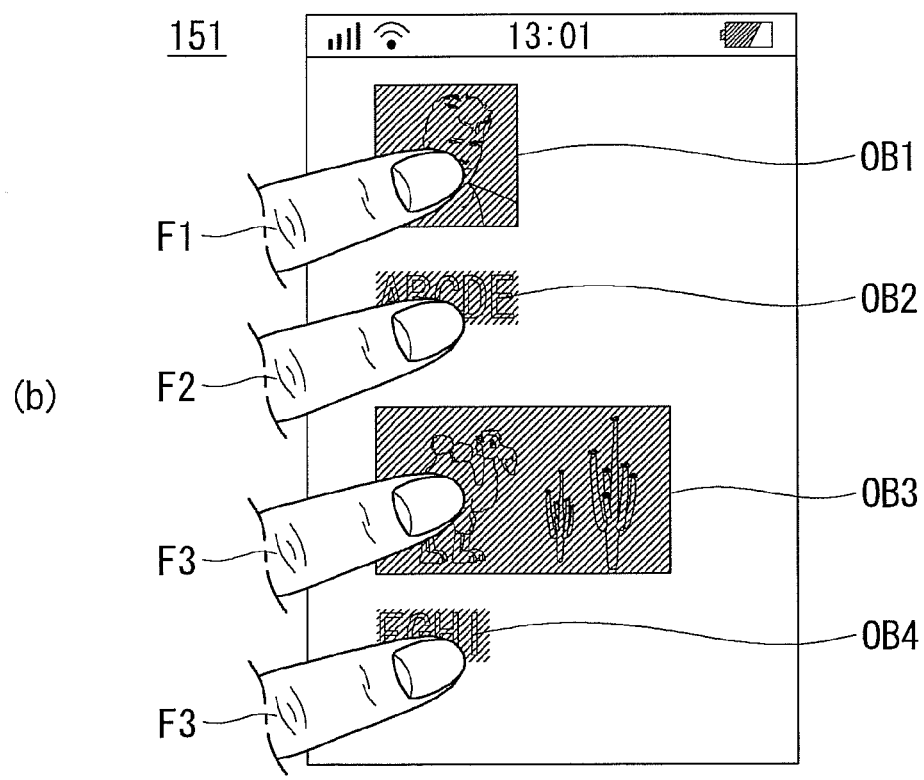
Figure 14:
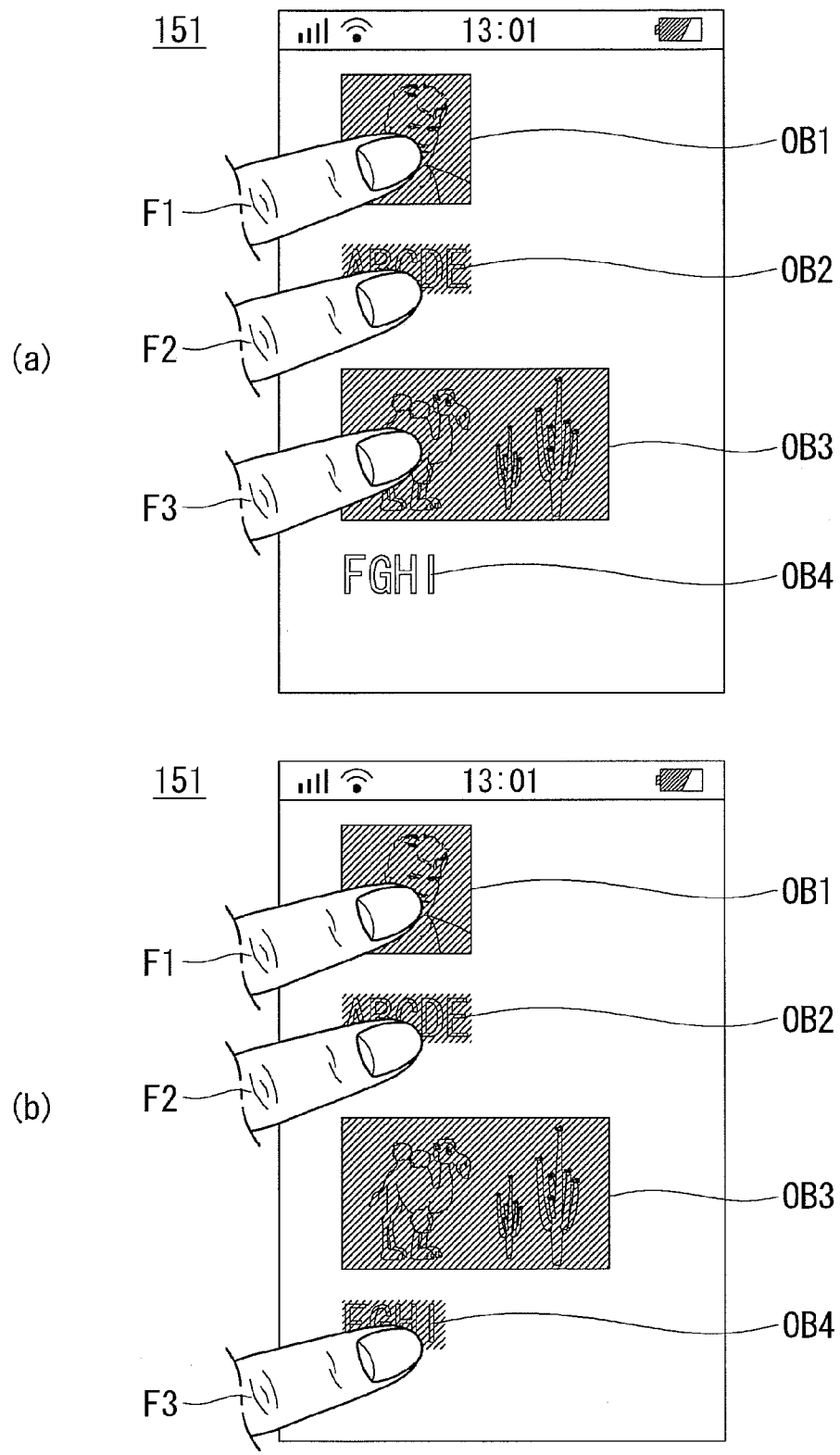
Figure 15:
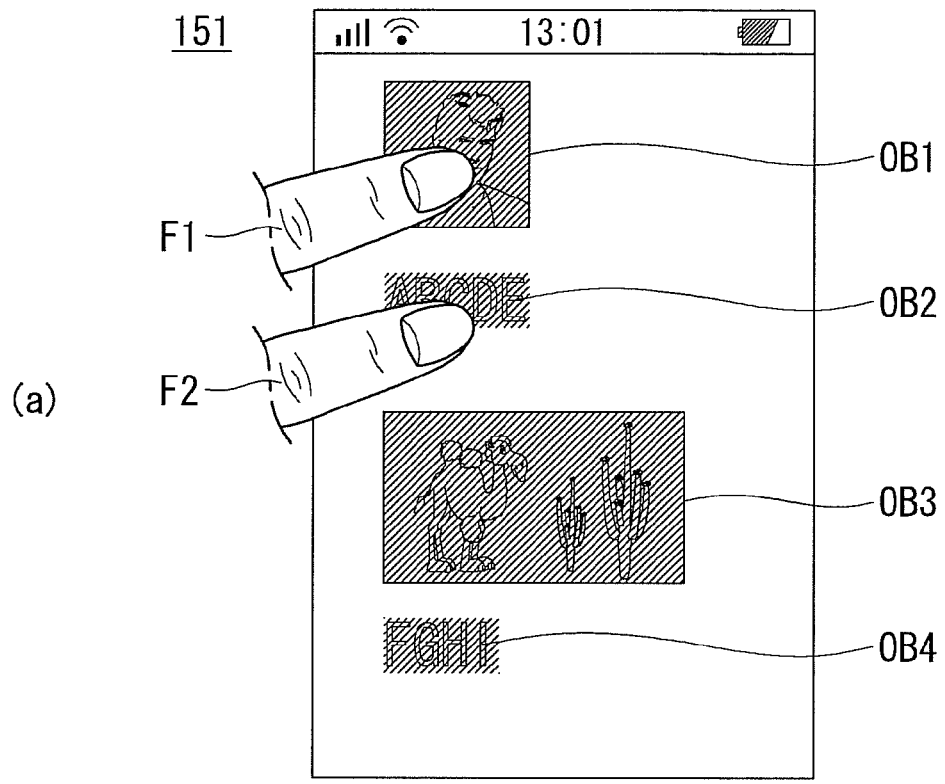
Figure 15:
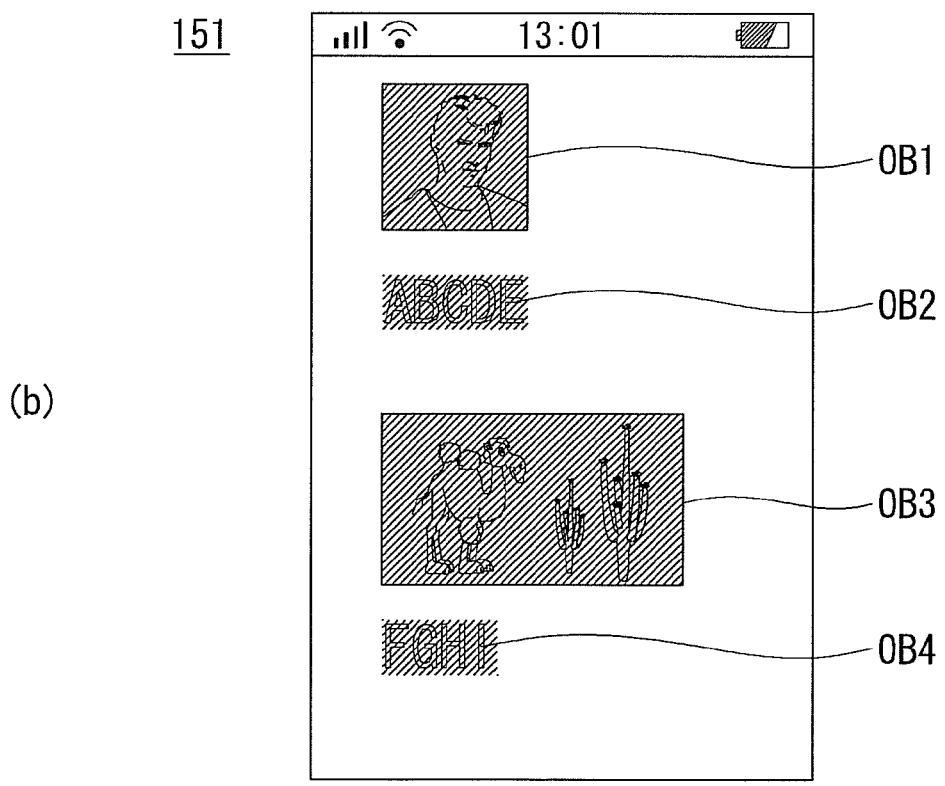

FIGS. 13 to 15 illustrate a procedure of selecting a plurality of objects in the mobile terminal, shown in FIG. 4.

As shown in FIGS. 13 to 15, the mobile terminal 100 can select a plurality of objects through various methods.

Referring to FIG. 13(a), the user can select the first and second objects OB1 and OB2 using first and second fingers F1 and F2.

Referring to FIG. 13(b), the user can additionally select third and fourth objects OB3 and OB4 using third and fourth fingers F3 and F4. That is, the user can select the objects OB3 and OB4 using the third and fourth fingers F3 and F4 while maintaining the touch using the first and second fingers F1 and F2.

Referring to FIG. 14(a), the user can select the first and second objects OB1 and OB2 with the first and second fingers F1 and F2. The controller 180 can change the color of the selected objects to represent selection of the objects. In the state that the first and second objects OB1 and OB2 are selected, the user can additionally select the third object OB3 with the third finger F3.

Referring to FIG. 14(b), the user can move the third finger F3 from the third object OB3 to the fourth object OB4. The controller 180 can maintain selection of the third object OB3. That is, selection of an object touched by a finger can be maintained even if touch by the finger is cancelled. In this case, touches of the first and second fingers F1 and F2 that perform the first touch can be maintained. When an object is additionally selected using the third finger F3 when touches of the first and second fingers F1 and F2 applied to the first and second objects OB1 and OB2 are maintained, additional selection of the object can be carried out.

Referring to FIG. 15(a), the user may select the third and fourth objects OB3 and OB4 in the state that the first touch is applied to the first and second objects OB1 and OB2 using the first and second fingers F1 and F2.

Referring to FIG. 15(b), upon selection of the third and fourth objects OB3 and OB4, selection of the objects can be maintained even if touches of the first and second fingers F1 and F2 are cancelled.

Figure 16:
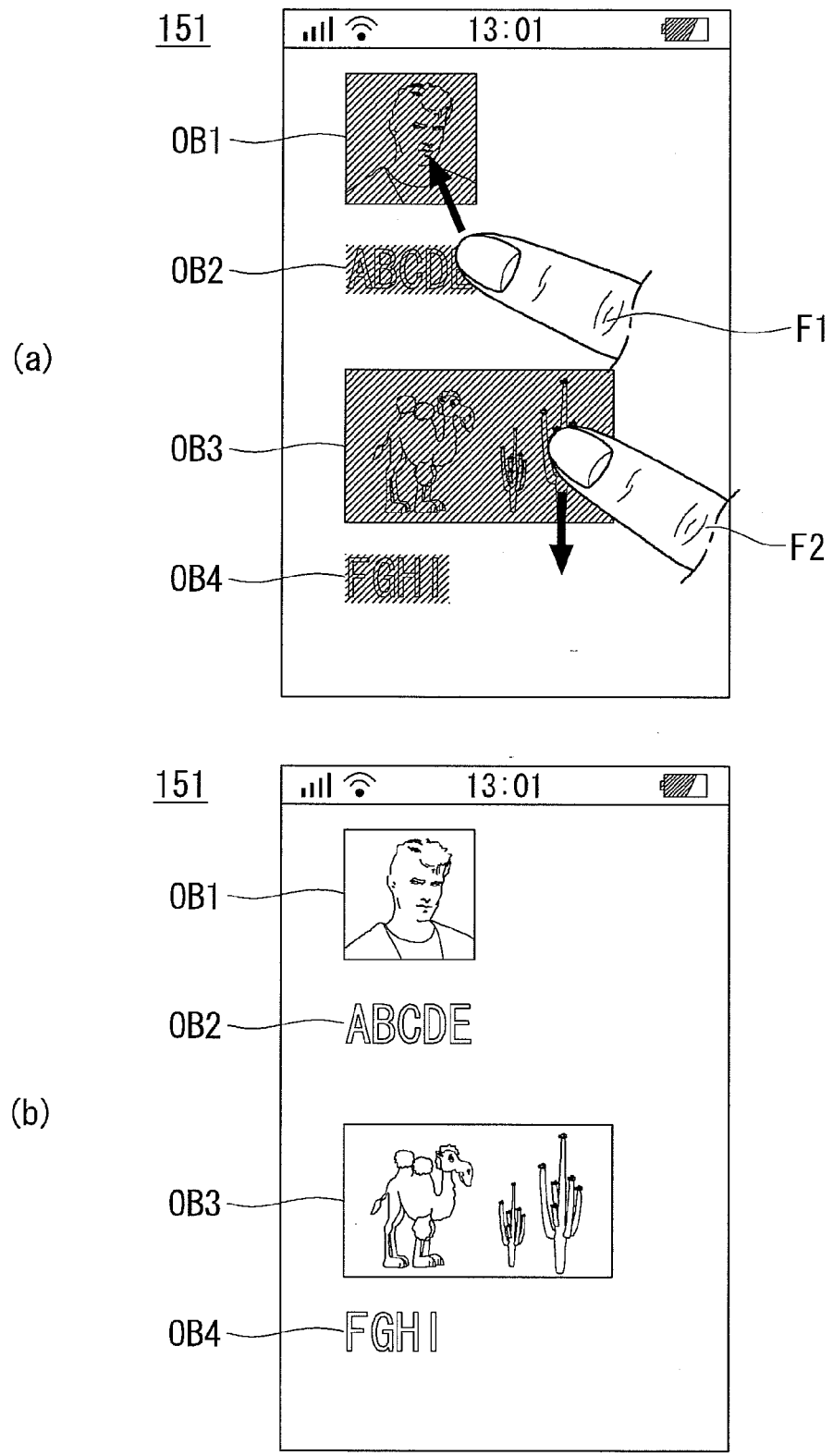
FIGS. 16 and 17 illustrate a procedure of cancelling selected objects in the mobile terminal of FIG. 4.
Figure 17:
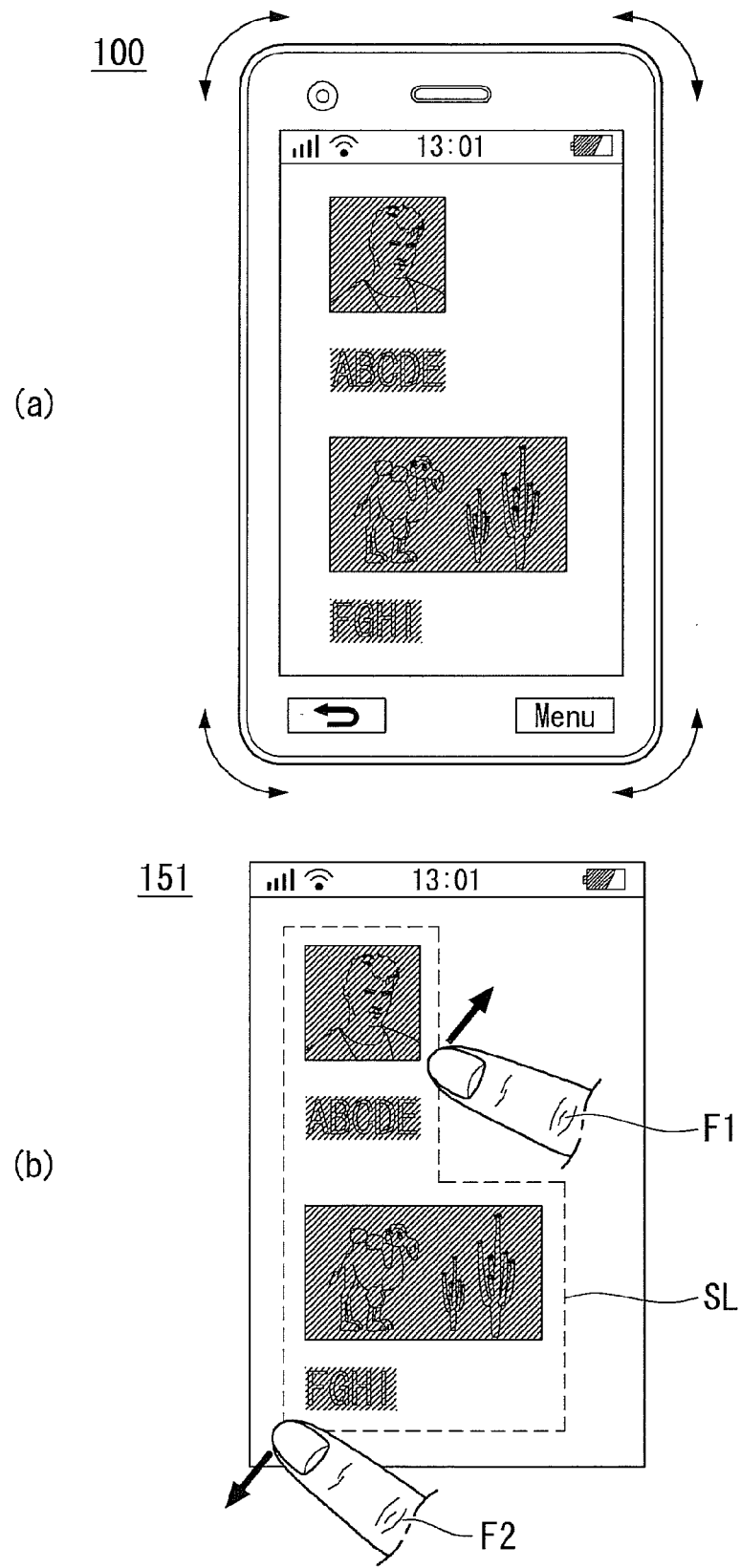

FIGS. 16 and 17 illustrate a procedure of cancelling selected objects in the mobile terminal shown in FIG. 4.

As shown in FIGS. 16 and 17, the mobile terminal 100 can cancel selection of objects through various methods.

Referring to FIG. 16(a), the user can drag the first and second fingers F1 and F2 in such a manner that the first and second fingers F1 and F2 pinch out upon selection of the objects. That is, the user can apply multi-touch in a direction in which the first and second fingers F1 and F2 become apart from each other.

Referring to FIG. 16(b), when the pinch-out drag touch is applied, the controller 180 can cancel selection of the objects. The controller 180 can cancel shade provided to the objects in order to represent that selection of the objects has been cancelled.

Referring to FIG. 17(a), the user can cancel selection of the objects by shaking the mobile terminal 100. That is, selection of the objects is cancelled when the posture sensor 141 senses a shaking gesture of the user.

Referring to FIG. 17(b), the controller 180 can display a selection line SL that surrounds the selected objects. The user can cancel selection of the objects by touching two points on the selection line SL with the first and second fingers F1 and F2 and pinching out the touched points.

Figure 18:
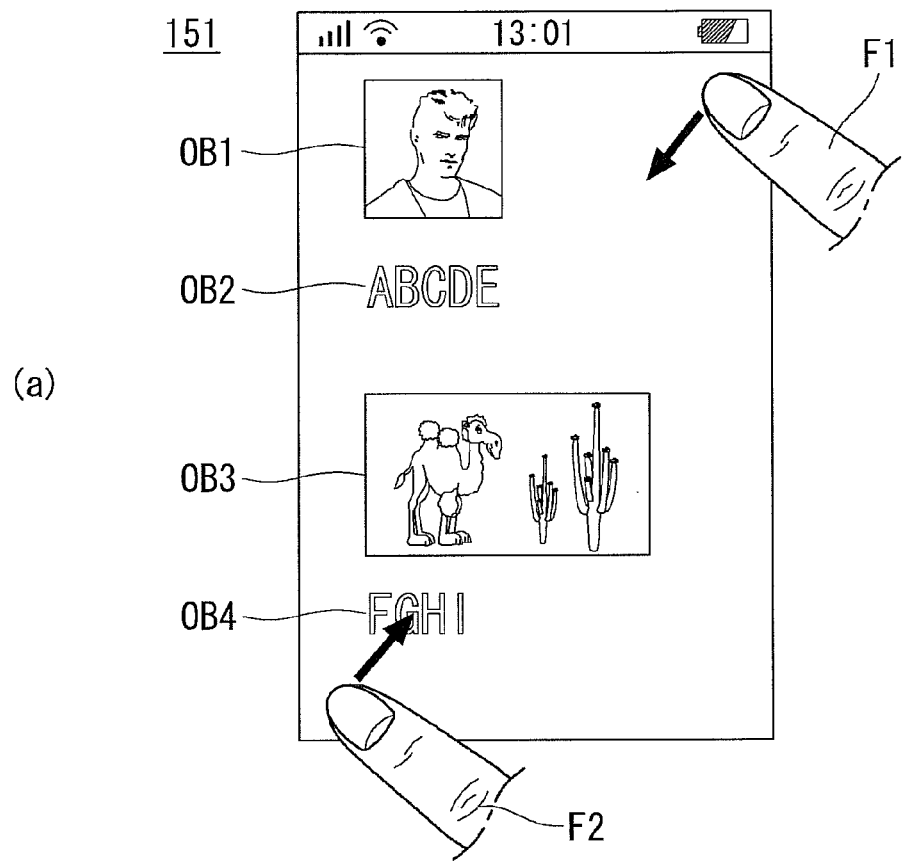
FIG. 18 illustrates a procedure of displaying a plurality of pages in the mobile terminal of FIG. 4.
Figure 18:
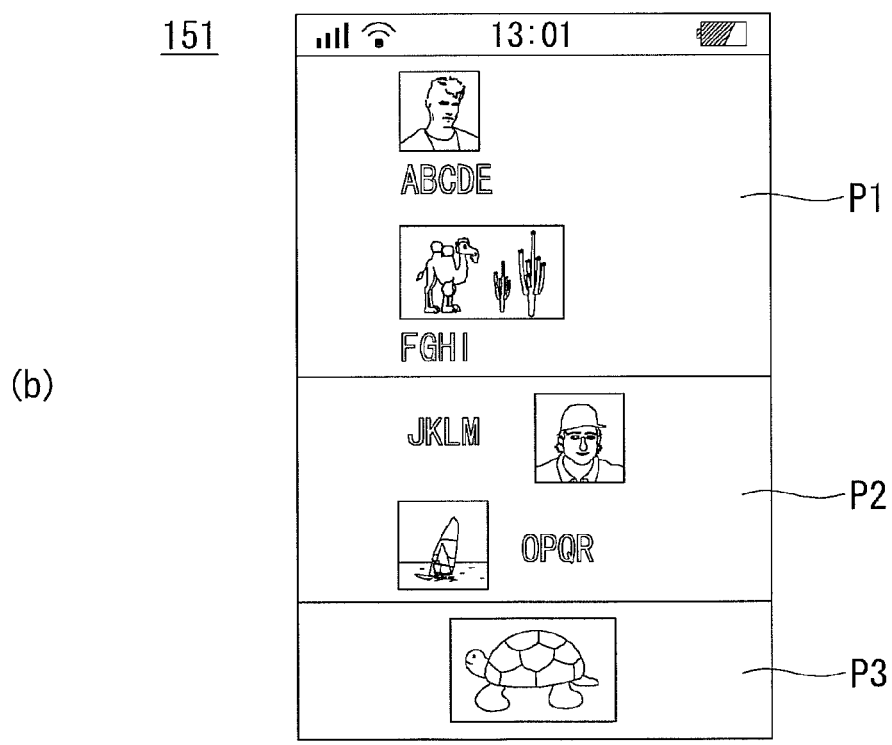

FIG. 18 illustrates a procedure of displaying a plurality of pages in the mobile terminal shown in FIG. 4.

As shown in FIG. 18, the controller 180 of the mobile terminal 100 can display a plurality of pages on the display 151 in response to a touch operation of the user.

Referring to FIG. 18(a), the user can perform a pinch-in touch operation on two points on the display 151. The display 151 may display only one page before the pinch-in touch operation. For example, only a specific page of a document being edited can be displayed on the display 151.

Referring to FIG. 18(b), when the user performs the pinch-in touch operation, the controller 180 can reduce the size of the specific page in response to the pinch-in touch operation and display other pages in a space obtained by decreasing the specific page. For example, a first page P1 is displayed before the pinch-in touch operation and first, second and third pages P1, P2 and P3 are displayed after the pinch-in touch operation.

Figure 19:
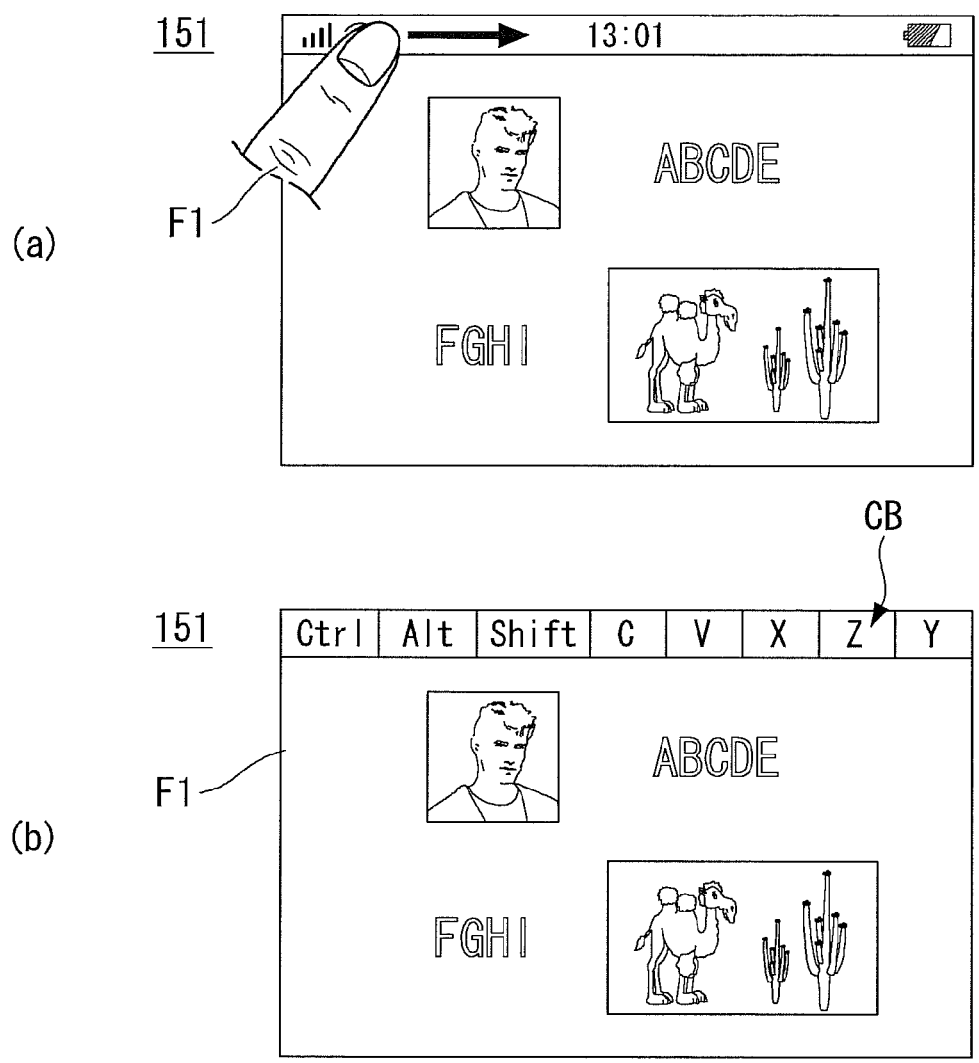
FIGS. 19 to 21 illustrate a procedure of manipulating a control bar in the mobile terminal of FIG. 4.
Figure 20:
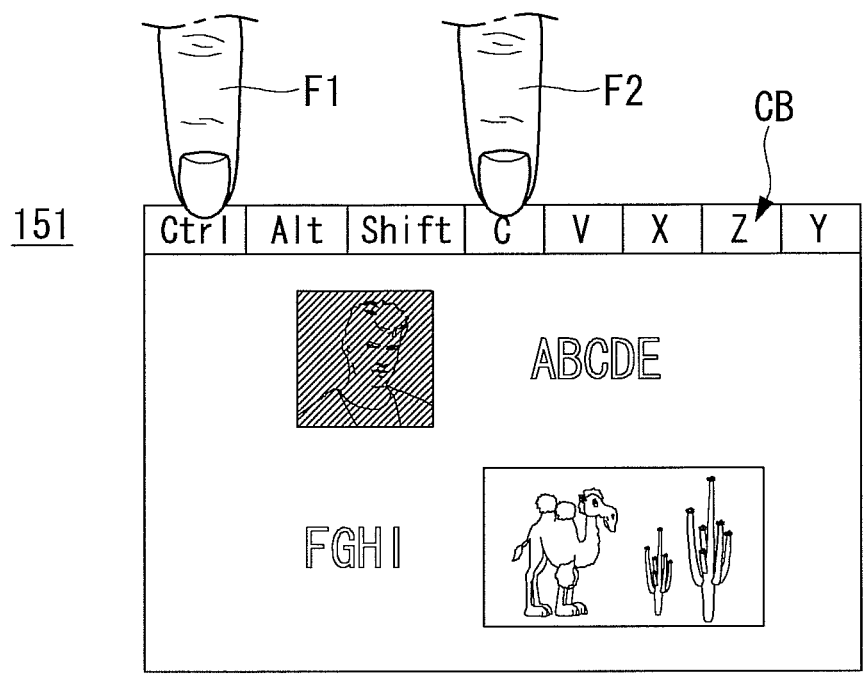
Figure 21:
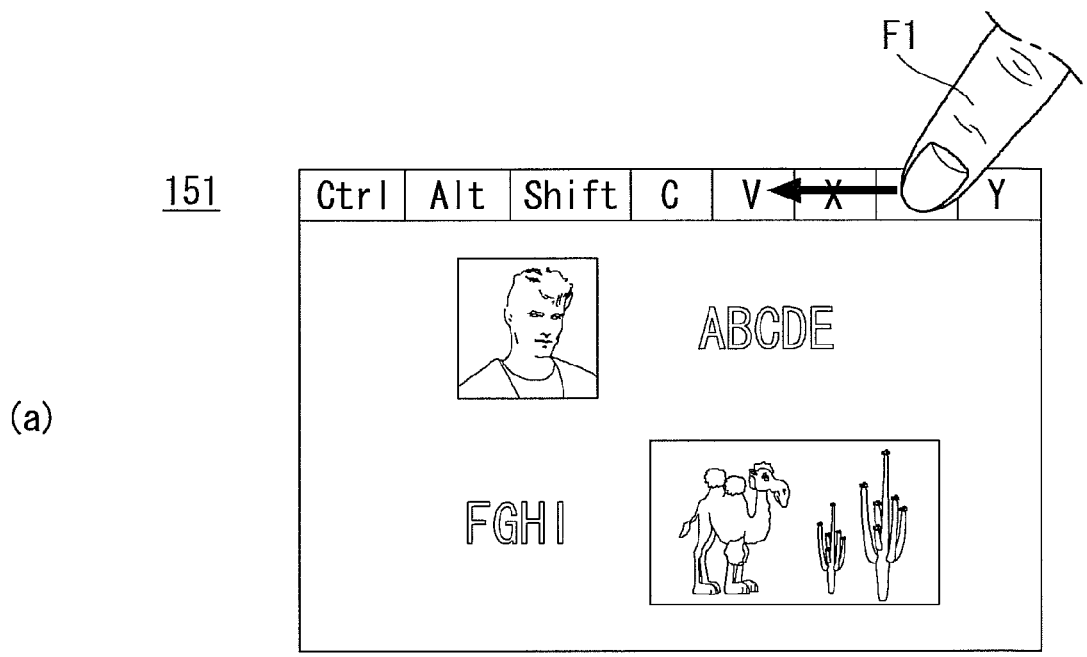
Figure 21:
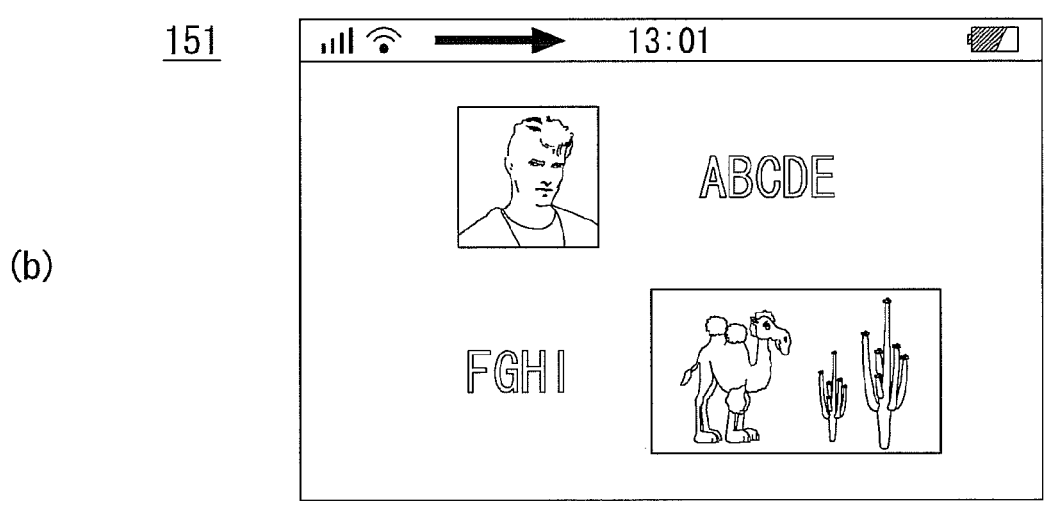

FIGS. 19 to 21 illustrate a procedure of manipulating a control bar in the mobile terminal shown in FIG. 4.

As shown in FIGS. 19 to 21, the controller 180 of the mobile terminal 100 can display a control bar CB in response to a specific touch operation of the user.

Referring to FIG. 19(a), the user can perform a touch operation of dragging an information display area located at the top of the display 151 using the first finger F1.

Referring to FIG. 19(b), upon execution of the touch operation of dragging the information display area, the controller 180 can display the control bar CB. The control bar CB may correspond to a plurality of soft keys displayed to effectively execute a function that requires a combination of keys.

Referring to FIG. 20, the user can apply a first touch to the control bar CB with the first finger F1 and then apply a second touch using the second finger F2. For example, the user can touch 'ctrl' key with the first finger F1 and touch 'c' key with the second finger F2. That is, a combination of keys 'ctrl+c' corresponding to a 'copy' function can be obtained using the control bar CB. Upon input of the key combination corresponding to the 'copy' function using the control bar CB, a selected object can be copied.

Referring to FIG. 21(a), the user can drag the control bar CB in one direction. In this case, one direction may be a direction opposite to the direction in which the control bar CB appears.

Referring to FIG. 21(b), when the user drags the control bar CB, the controller 180 can make the displayed control bar CB disappear.

Figure 22:
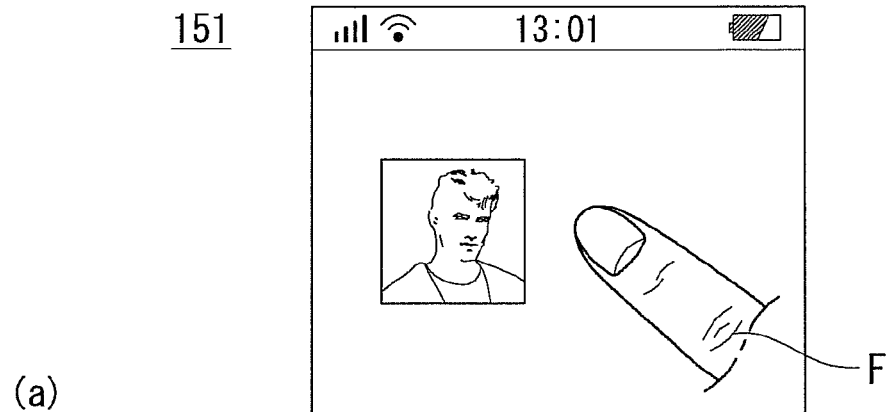
FIG. 22 illustrates a procedure of inputting a character in the mobile terminal of FIG. 4.
Figure 22:
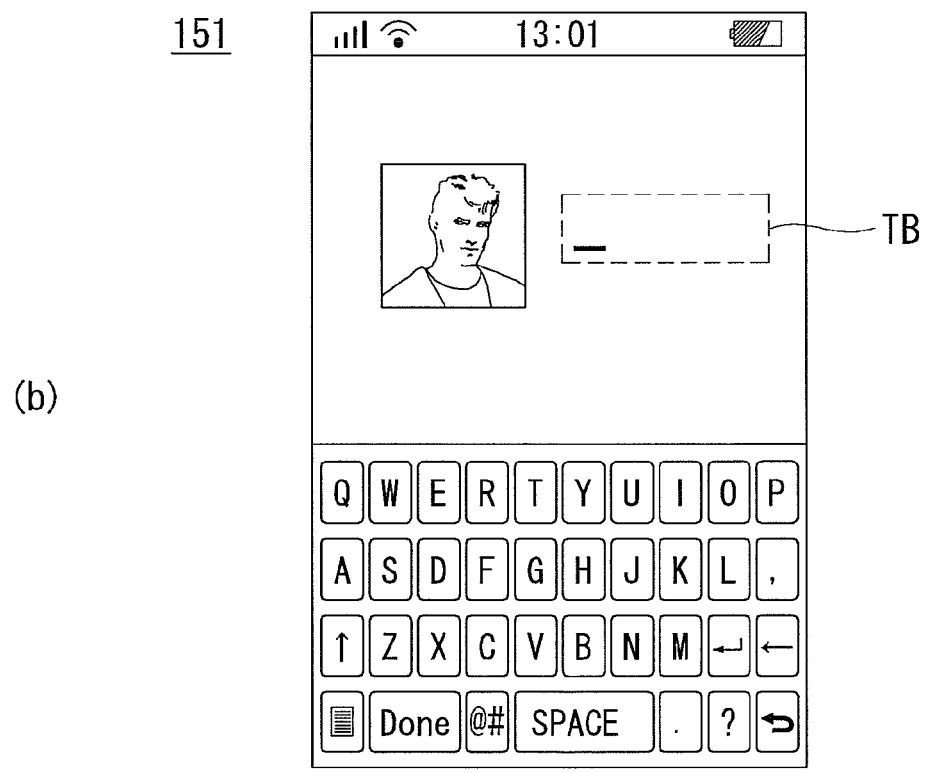

FIG. 22 illustrates a procedure of inputting letters in the mobile terminal shown in FIG. 4.

As shown in FIG. 22, the controller 180 of the mobile terminal 100 can input a letter by touching a specific point of the display 151.

Referring to FIG. 22(a), the user can touch a specific point of the display 151. Touch applied to the specific point may be long touch performed for a predetermined time or longer. The specific point may be a point at which an object is not displayed.

Referring to FIG. 22(b), when the user touches the specific point, a text box TB to which a character can be input can be displayed. Characters can be input to the text box TB through a qwerty keyboard displayed on the display 151.

Figure 23:
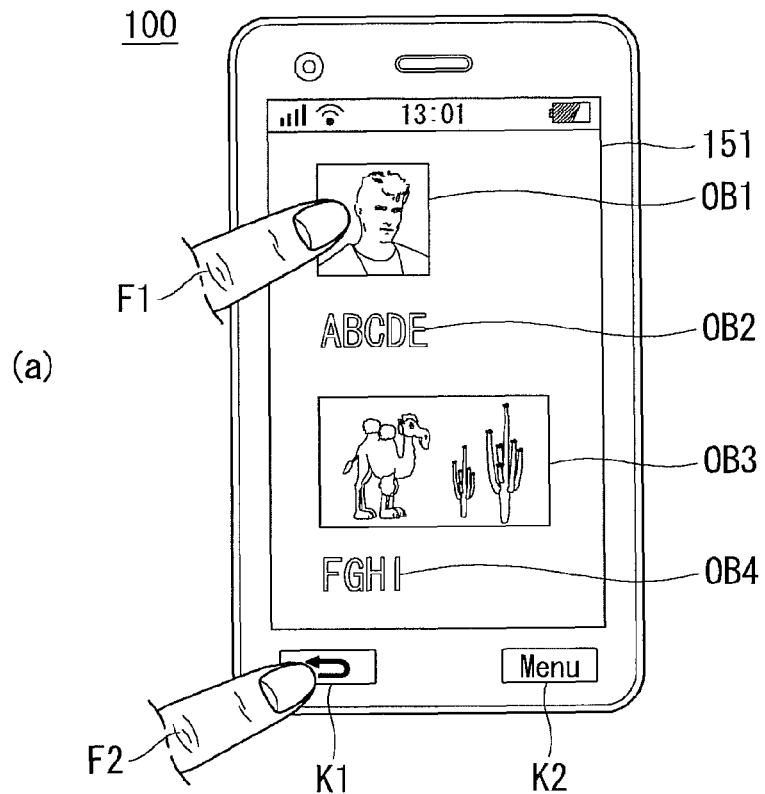
FIGS. 23 to 25 illustrate an operation using a key in the mobile terminal of FIG. 4.
Figure 23:
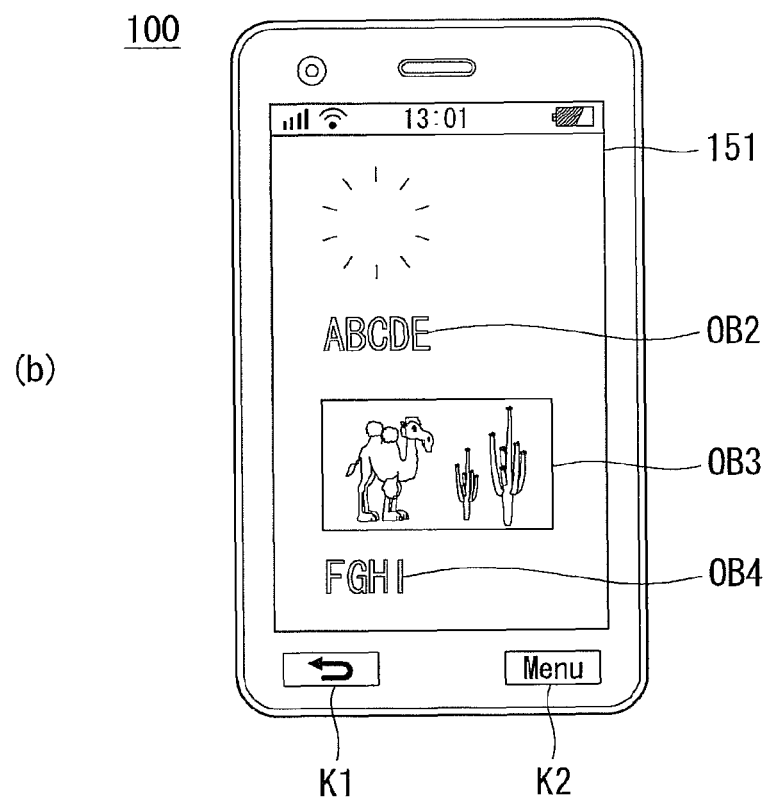
Figure 24:
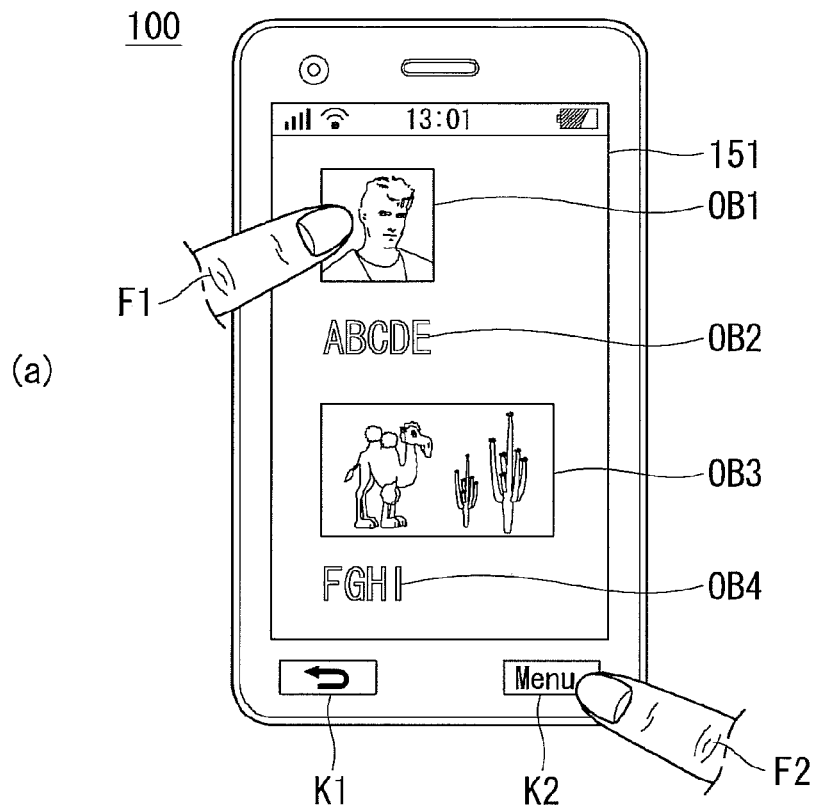
Figure 24:
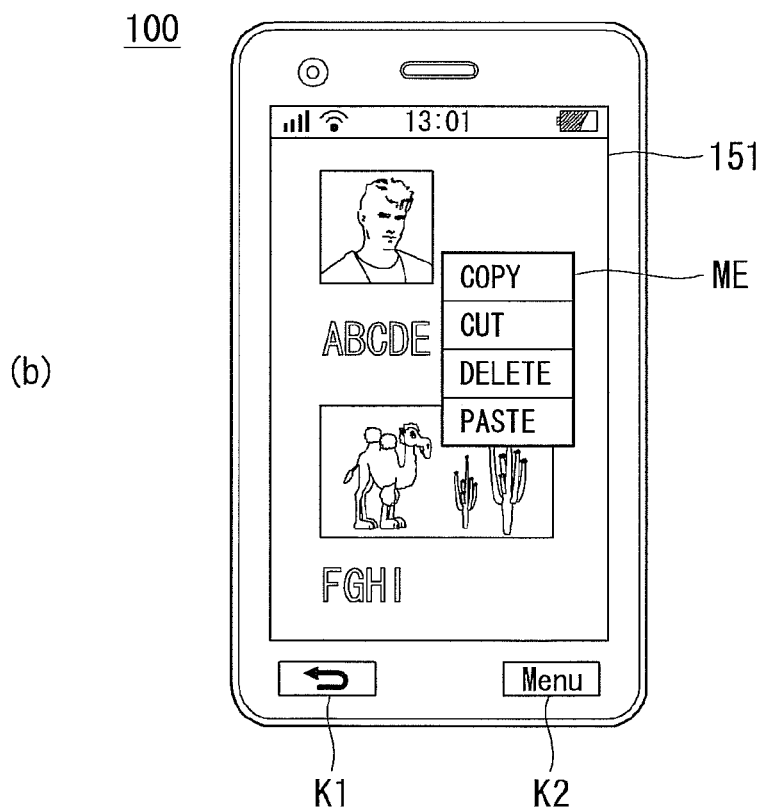
Figure 25:
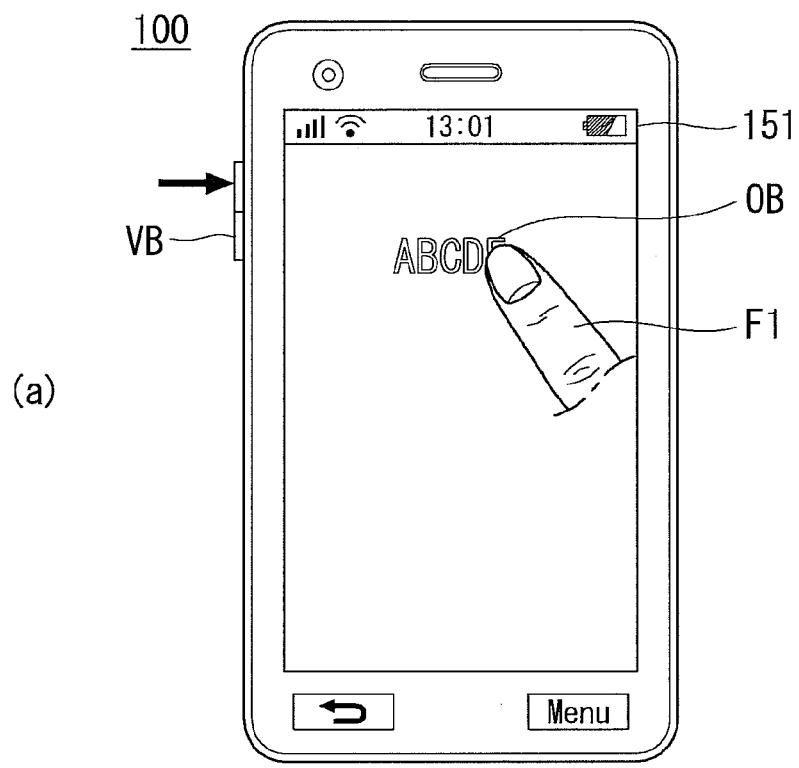
Figure 25:
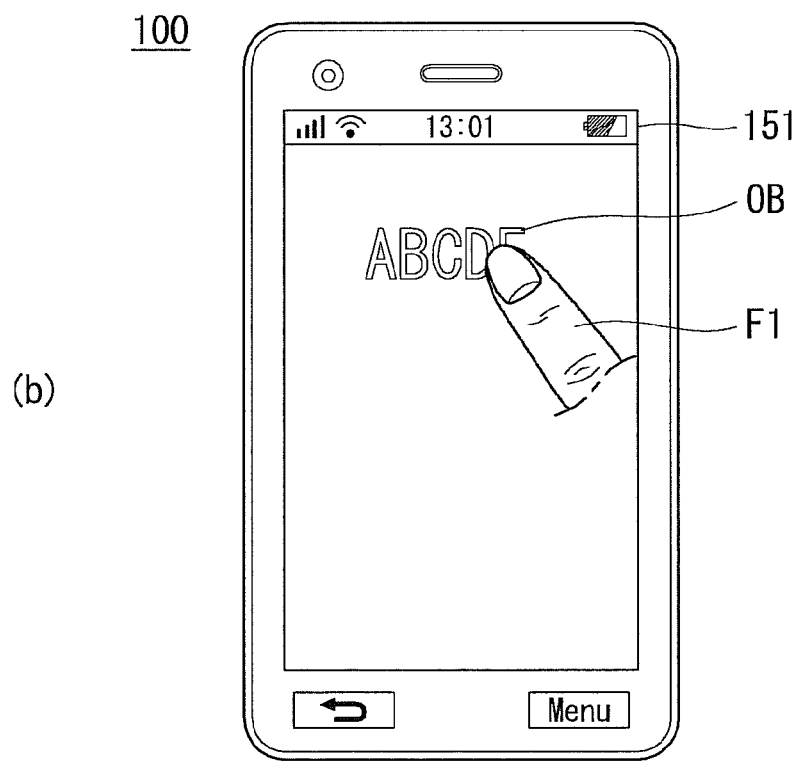

FIGS. 23 to 25 illustrate an operation using a key in the mobile terminal of FIG. 4.

As shown in FIGS. 23 to 25, the controller 180 of the mobile terminal 100 can manipulate a selected object using a key of the mobile terminal 100.

Referring to FIG. 23(a), the user can select the first object OB1 using the first finger F1. In this state, the user can select a first key K1 using the second finger F2. The first key K1 may be a key provided separately from the display 151. For example, the first key K1 can be provided in the form of a touchpad, button or the like. The first key K1 may be a key to which a function of returning a state of a currently executed application is allocated.

Referring to FIG. 23(b), upon selection of the first key K1 in the state that the first object OB1 is selected, the displayed first object OB1 may disappear.

Referring to FIG. 24(a), the user may select the first object OB1 using the first finger F1. In this state, the user can select a second key K2 using the second finger F2. The second key K2 may be a key relating to selection of a menu.

Referring to FIG. 24(b), upon selection of the second key K2, the controller 180 can display a menu relating to the selected first object OB1. For example, if the first object OB1 is an image, a menu pop-up window through which functions of copying, cutting, deleting and pasting an image can be easily selected can be displayed.

Referring to FIG. 25(a), the user can select an object OB using the first finger F1. The user can push a volume key VB while the object OB is selected. For example, the user can push a key for increasing the volume or a key for decreasing the volume.

Referring to FIG. 25(b), when the user pushes the volume key VB for increasing the volume while touching the object OB with the first finger F1, the object OB can be enlarged.

Figure 26:
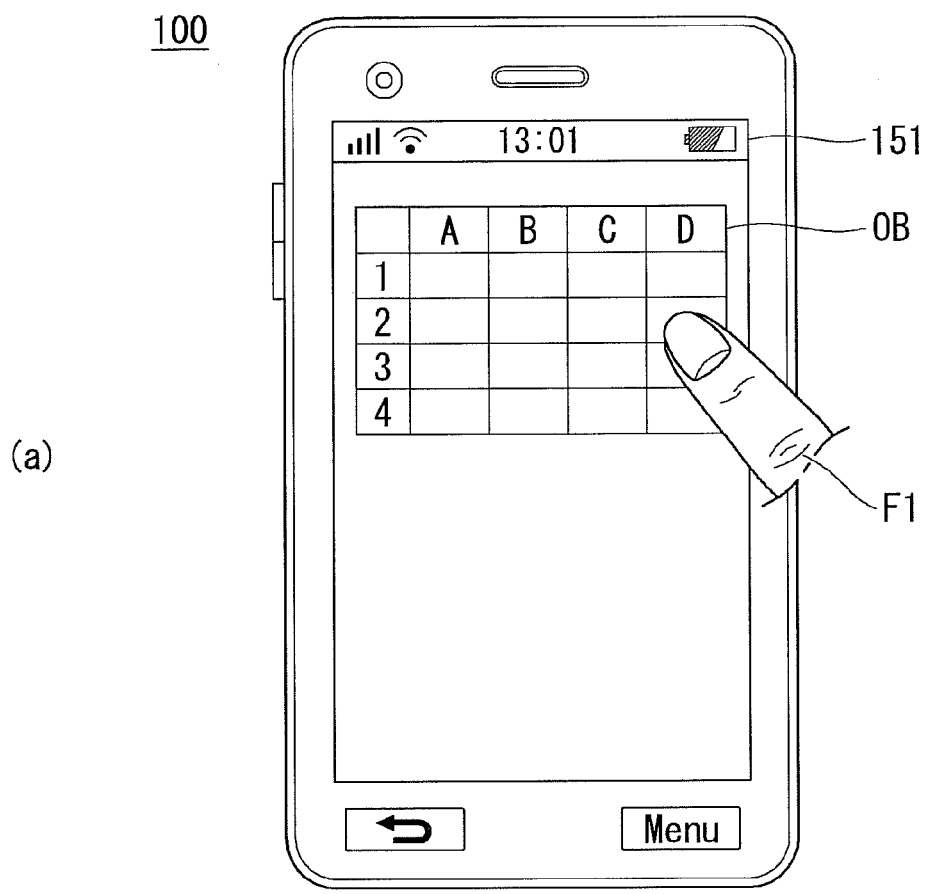
FIG. 26 illustrates an operation according to a direction of the mobile terminal of FIG. 4.
Figure 26:
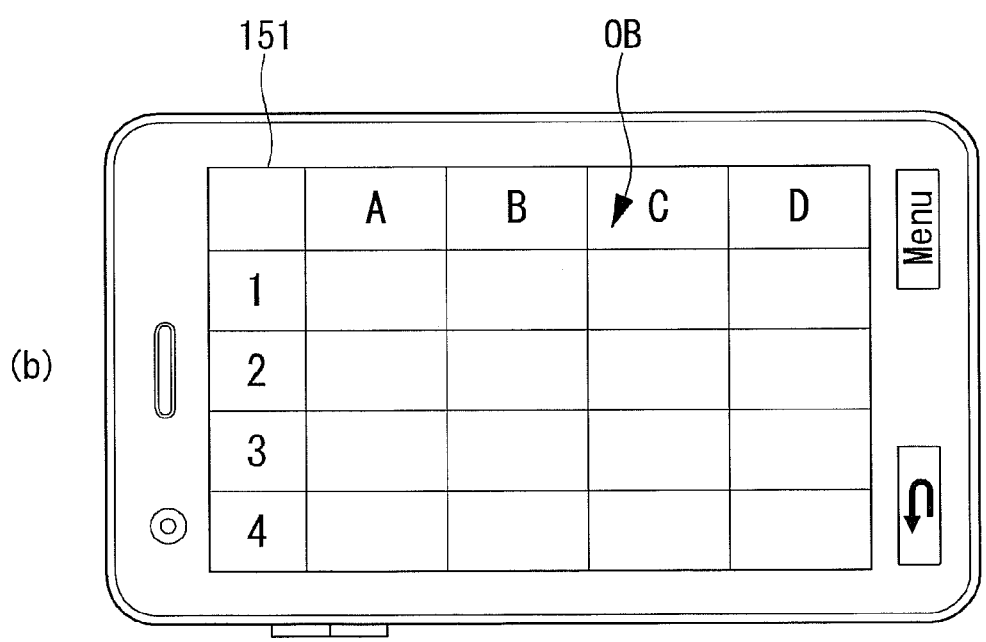

FIG. 26 illustrates an operation according to orientation of the mobile terminal in the mobile terminal of FIG. 4.

As shown in FIG. 26, the controller 180 of the mobile terminal 100 can display an object OB differently according to orientation of the mobile terminal 100.

Referring to FIG. 26(a), the user can select the object OB with the first finger F1 when the mobile terminal is positioned in the portrait form. The selected object OB may be displayed in part of the display 151. For example, the selected object OB can be a chart.

Referring to FIG. 26(b), the user may change the position of the mobile terminal 100 to the landscape form while touching the object OB. That is, the orientation of the mobile terminal 100 can be changed from the vertical direction to the horizontal direction. Upon change of the orientation of the mobile terminal 100, the object OB can be enlarged and displayed in the overall area of the display 151. That is, the object OB can be displayed in full screen.

Figure 27:
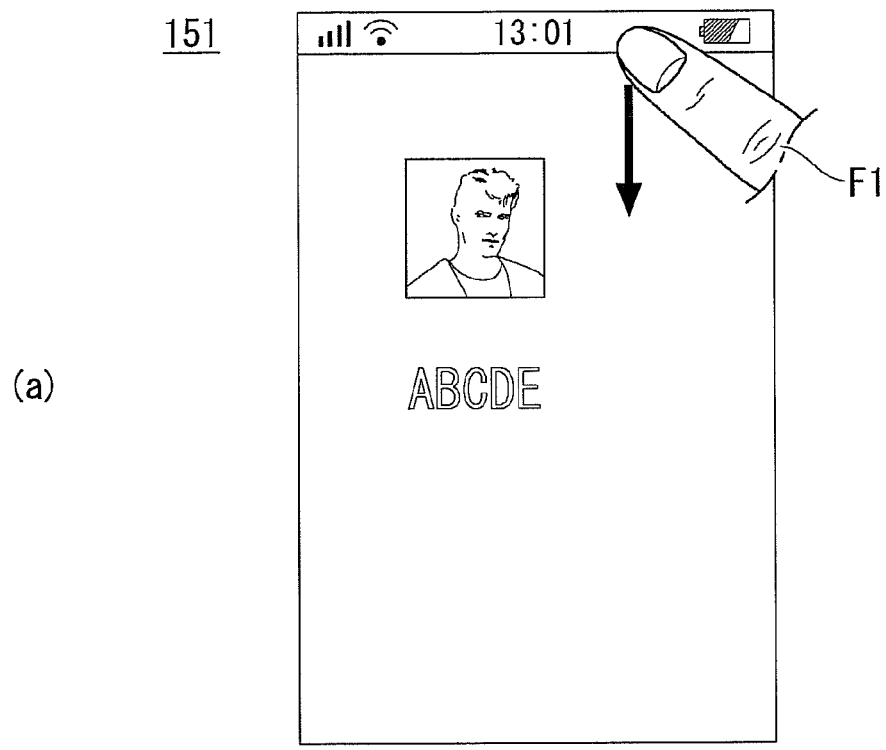
FIG. 27 illustrates a procedure of displaying a guideline in the mobile terminal of FIG. 4.
Figure 27:
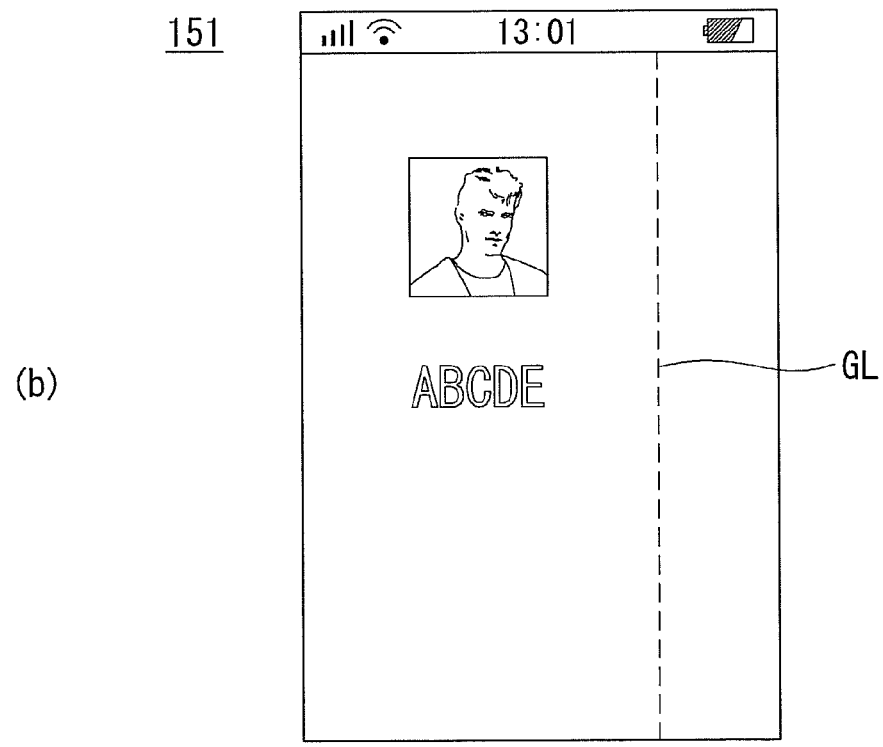

FIG. 27 illustrates a procedure of displaying a guideline in the mobile terminal of FIG. 4.

As shown in FIG. 27, the controller 180 of the mobile terminal 100 can display a guideline GL in response to a touch operation of the user.

Referring to FIG. 27(a), the user can apply drag touch from the top to the bottom of the display 151 using the first finger F1.

Referring to FIG. 27(b), upon the drag touch of the user, the controller 180 can display the guideline GL on the basis of the position and/or direction of the drag touch. The guideline GL can be generated in the horizontal or vertical direction according to user touch. When the guideline GL is displayed, the user can easily select a location in which an object will be arranged.

Figure 28:
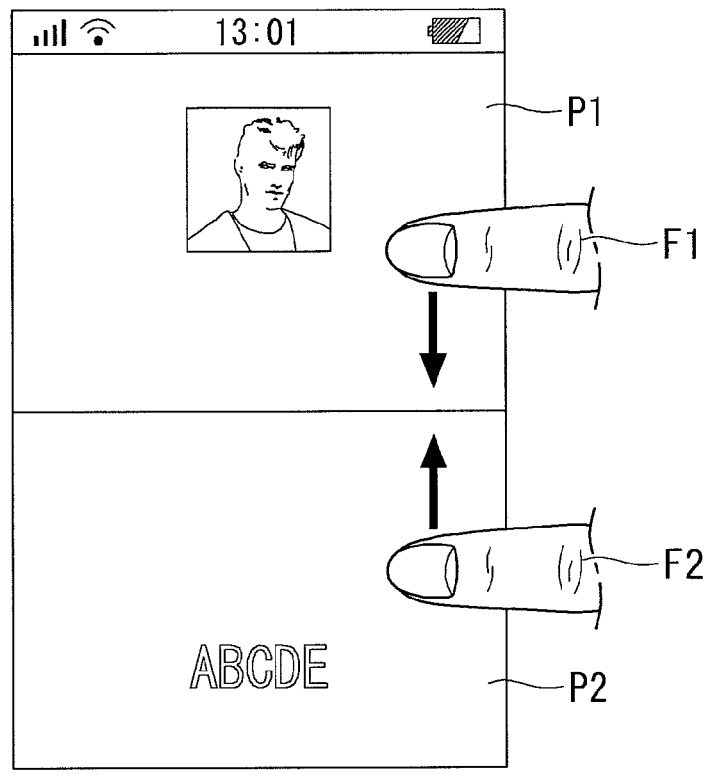
FIG. 28 illustrates a procedure of merging pages in the mobile terminal of FIG. 4.
Figure 28:
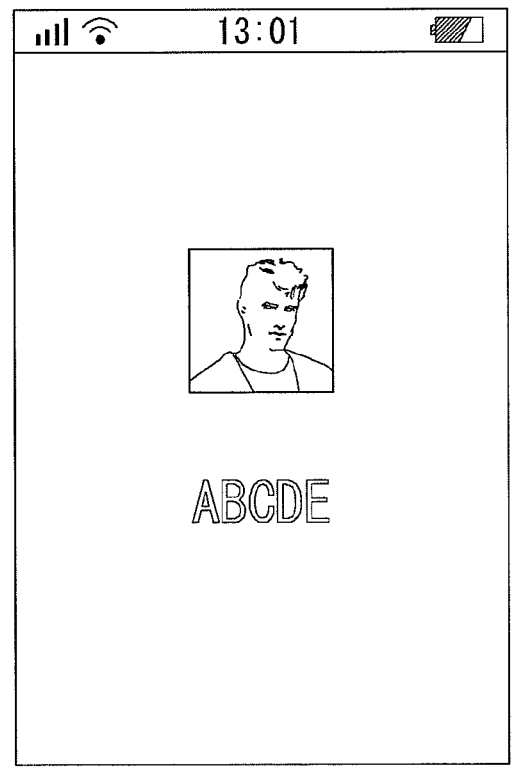

FIG. 28 illustrates a procedure of merging pages in the mobile terminal of FIG. 4.

As shown in FIG. 28, the controller 180 of the mobile terminal 100 can easily merge a plurality of pages according to user touch.

Referring to FIG. 28(a), first and second pages P1 and P2 may be displayed on the display 151. The user can perform a pinch-in touch operation on the first and second pages P1 and P2 using the first and second fingers F1 and F2.

Referring to FIG. 28(b), upon the pinch-in touch operation, the controller 180 can display objects corresponding to the first and second pages in one page. That is, the pages can be merged through a simple touch operation.

Figure 29:
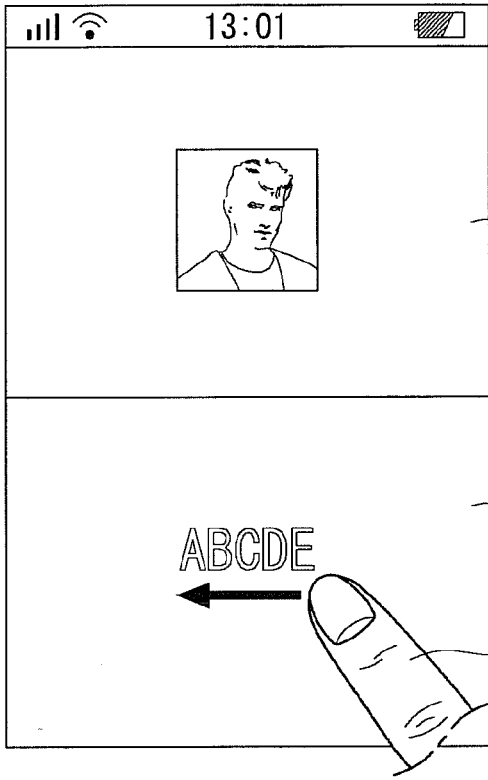
FIG. 29 illustrates a procedure of deleting a page in the mobile terminal of FIG. 4.
Figure 29:
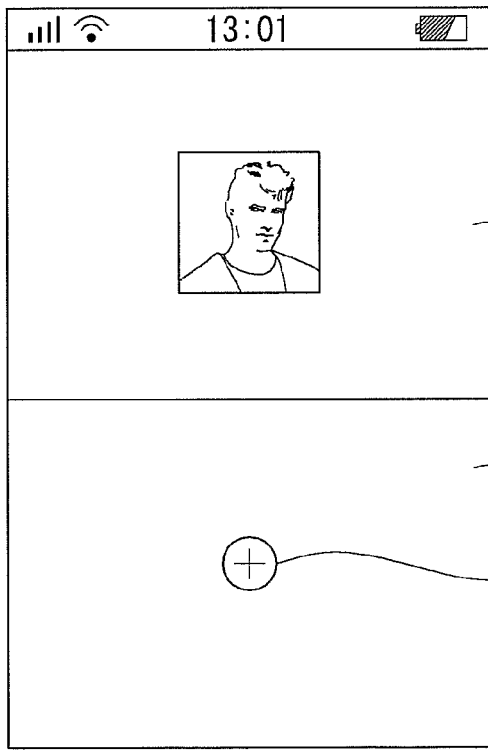

FIG. 29 illustrates a procedure of deleting a page in the mobile terminal of FIG. 4.

As shown in FIG. 29, the controller 180 of the mobile terminal 100 can easily delete a specific page according to a touch operation of the user.

Referring to FIG. 29(a), first and second pages P1 and P2 may be displayed on the display 151. The user can perform a touch operation of dragging or flicking the second page P2 using the first finger F1.

Referring to FIG. 29(b), upon the touch operation of the user, the controller 180 can delete the second page P2 on which the touch operation is performed. An addition button AB by which a new page is added may be displayed in a space from which the second page P2 has been deleted.

Figure 30:
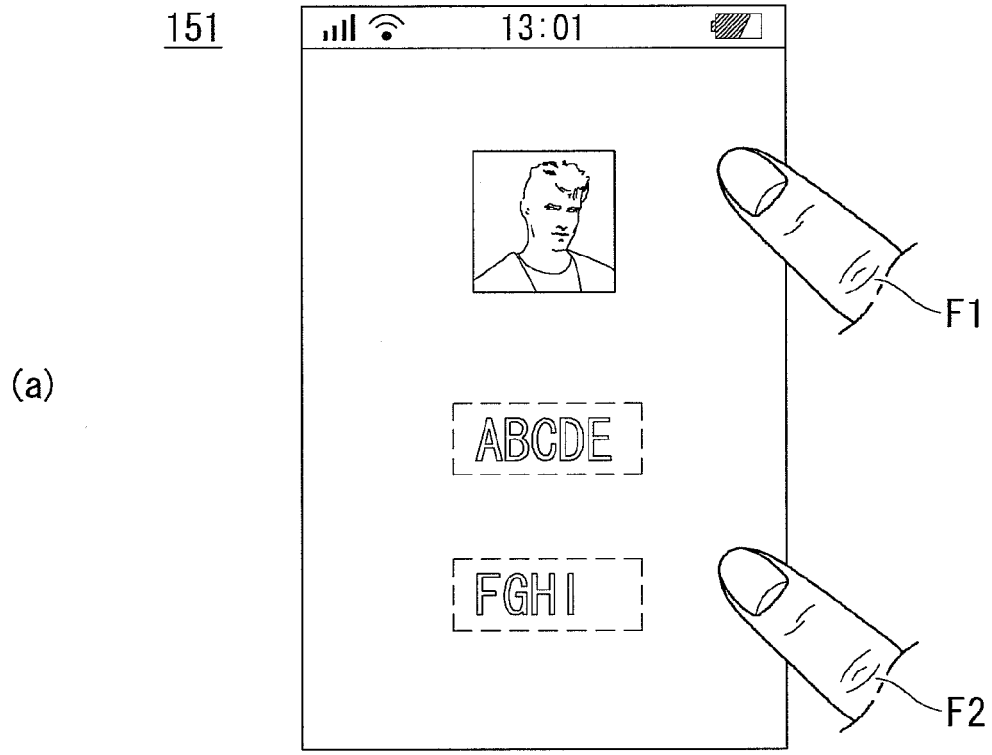
FIG. 30 illustrates a procedure of editing a page in the mobile terminal of FIG. 4.
Figure 30:
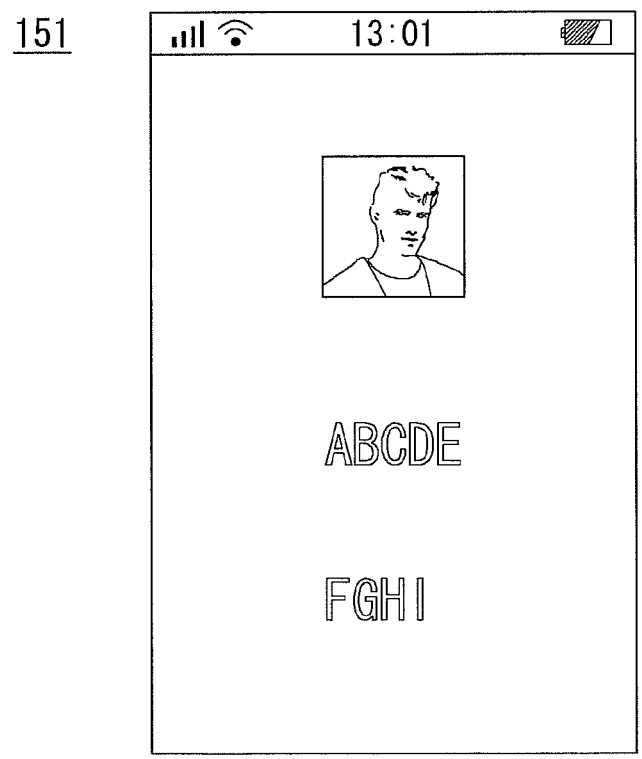

FIG. 30 illustrates a procedure of editing a page in the mobile terminal of FIG. 4.

As shown in FIG. 30, the controller 180 of the mobile terminal 100 can change an edit mode and a view mode.

Referring to FIG. 30(a), the mobile terminal 100 may be in the edit mode in which an object is edited. In the edit mode, the user can add, delete or change an object. When the mobile terminal 100 is in the edit mode, the controller 180 can represent an editable object by displaying a dotted line around the editable object. In the edit mode, the user can touch the display 151 using the first and second fingers F1 and F2. This touch operation may be an operation of touching the display 151 twice using the first and second fingers F1 and F2.

Referring to FIG. 30(b), when the user touches the display 151 twice using the first and second fingers F1 and F2, the mobile terminal 100 can enter the view mode. The view mode may be a mode in which a displayed object cannot be edited. When the user touches the display 151 twice using the first and second fingers F1 and F2 in the view mode, the mobile terminal 100 can enter the edit mode. That is, the edit mode and the view mode can be changed to each other according to a touch operation of the user.

Figure 31:
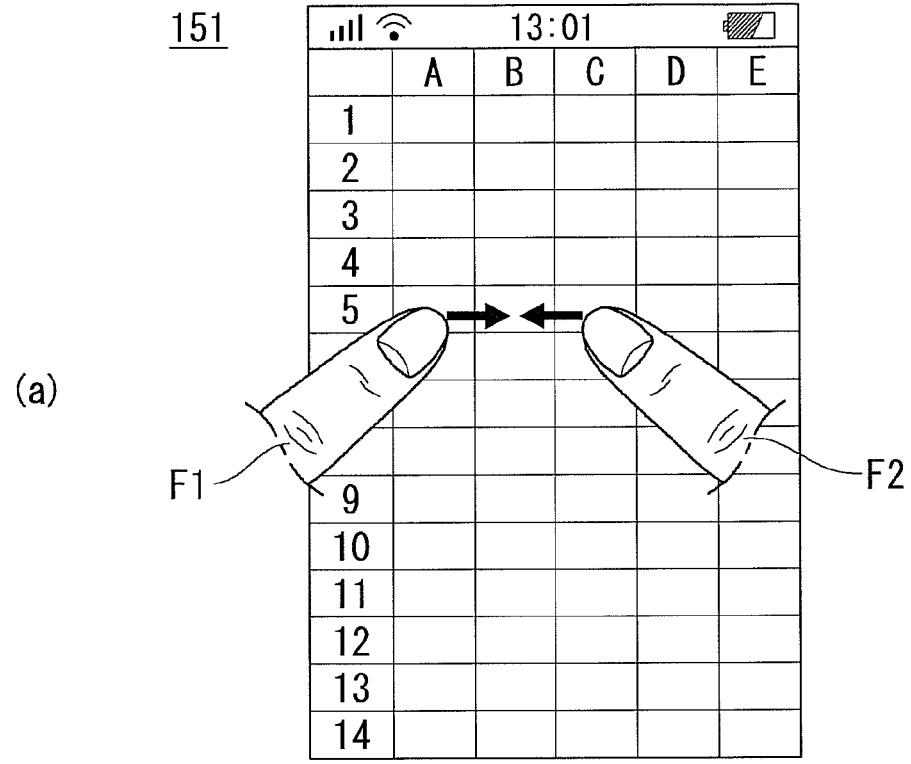
FIGS. 31 and 32 illustrate procedures of deleting and restoring a specific column in a chart in the mobile terminal of FIG. 4.
Figure 31:
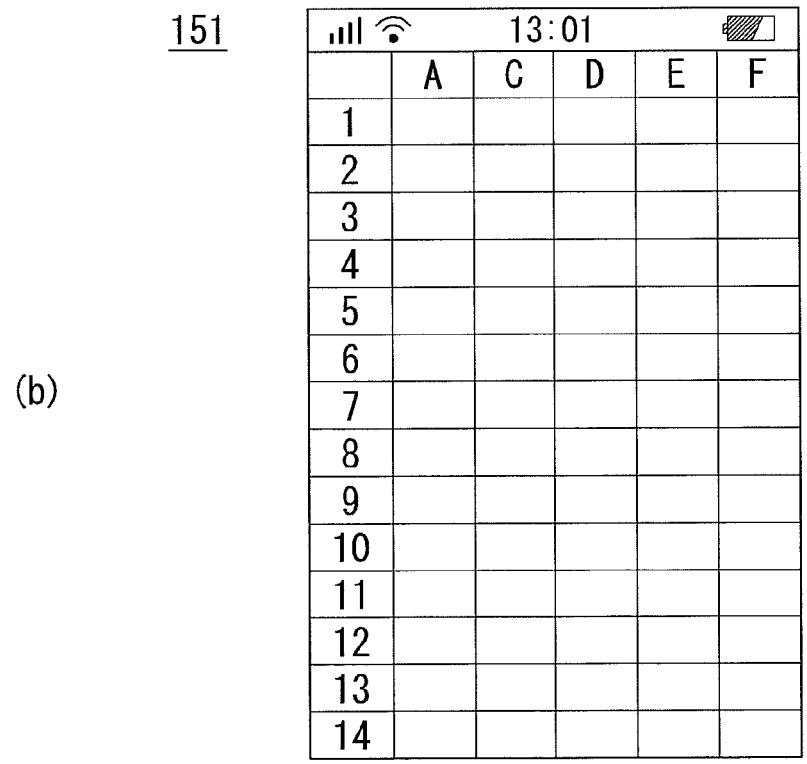
Figure 32:
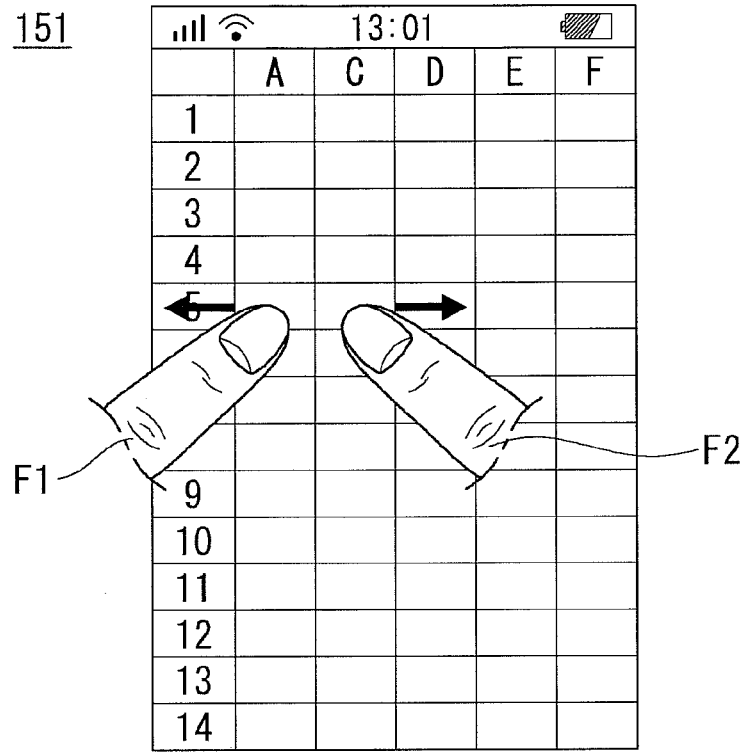
Figure 33:
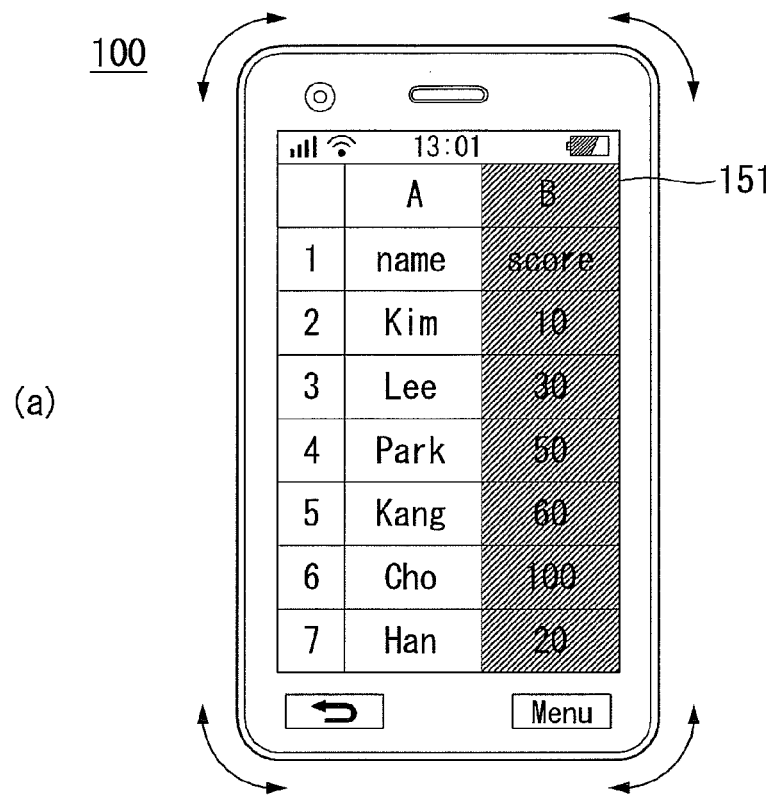
FIGS. 33 to 37 illustrate procedures of aligning a chart in the mobile terminal of FIG. 4.
Figure 33:
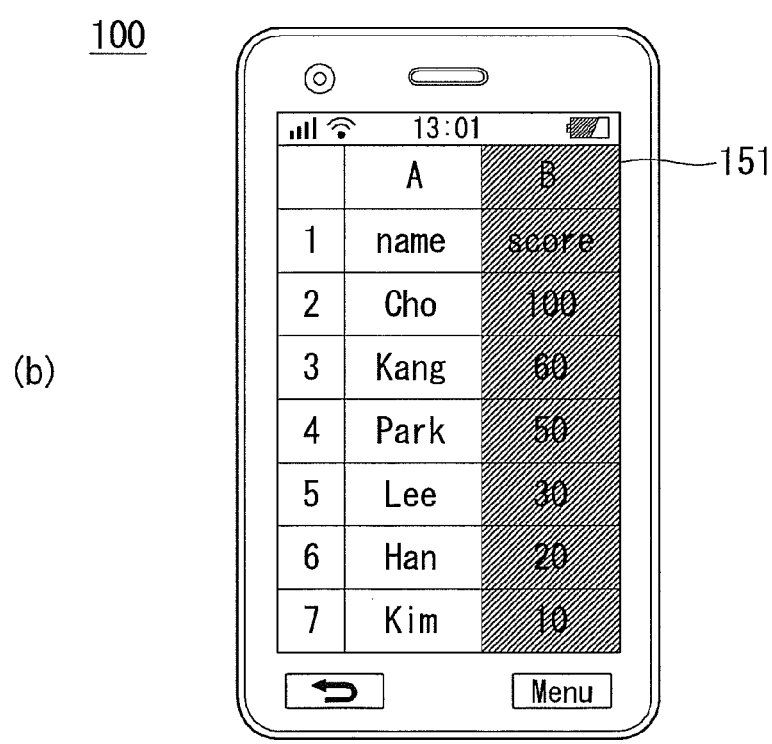
Figure 34:
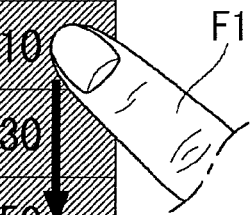
Figure 35:
Figure 36:
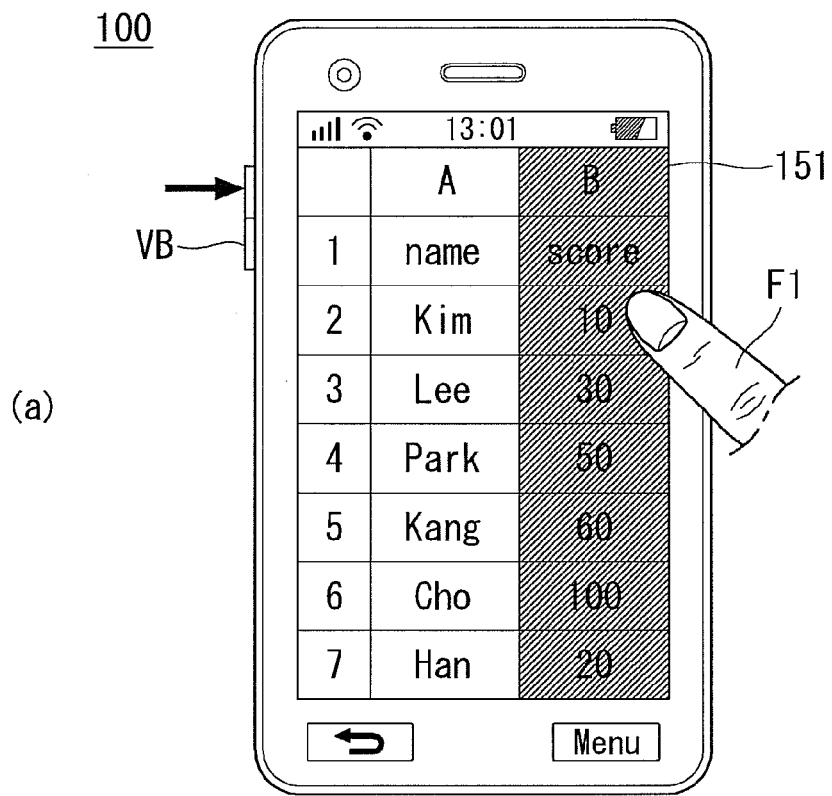
Figure 36:
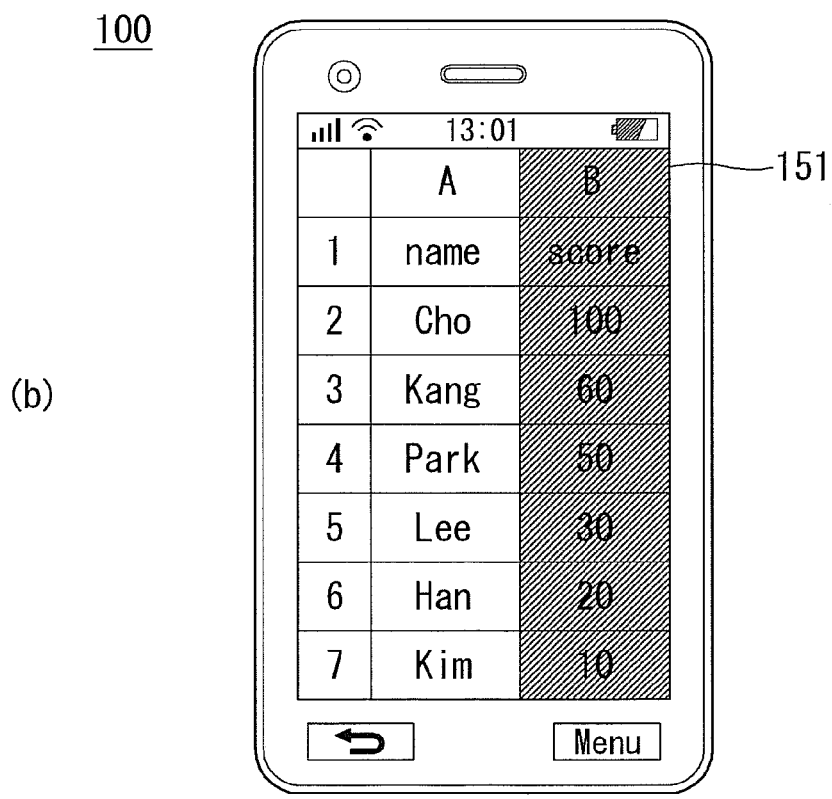
Figure 37:
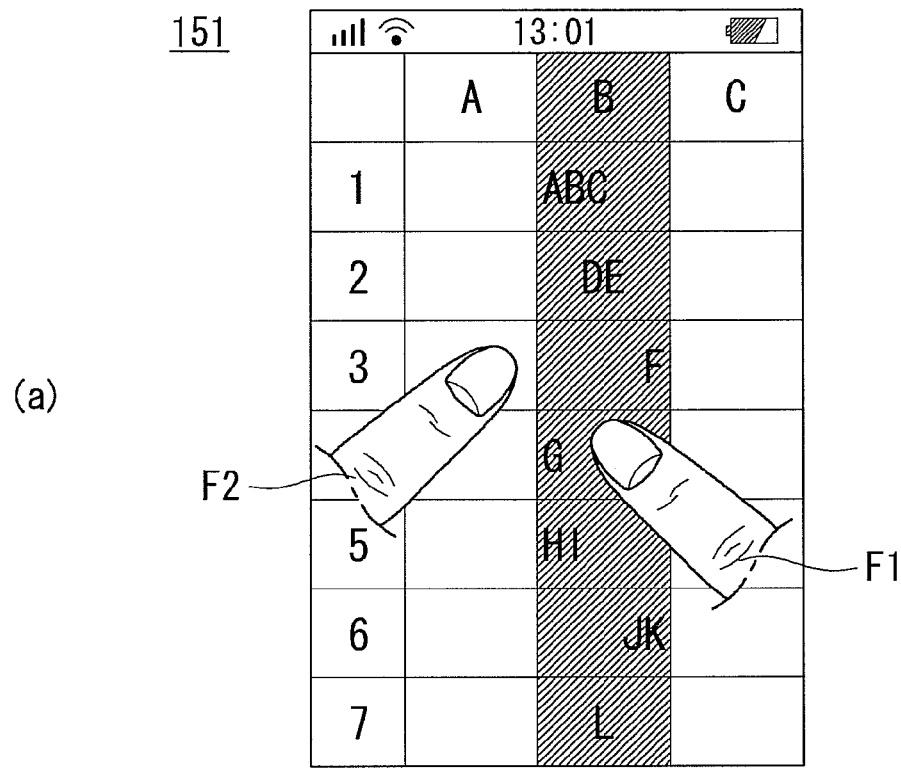
Figure 37:
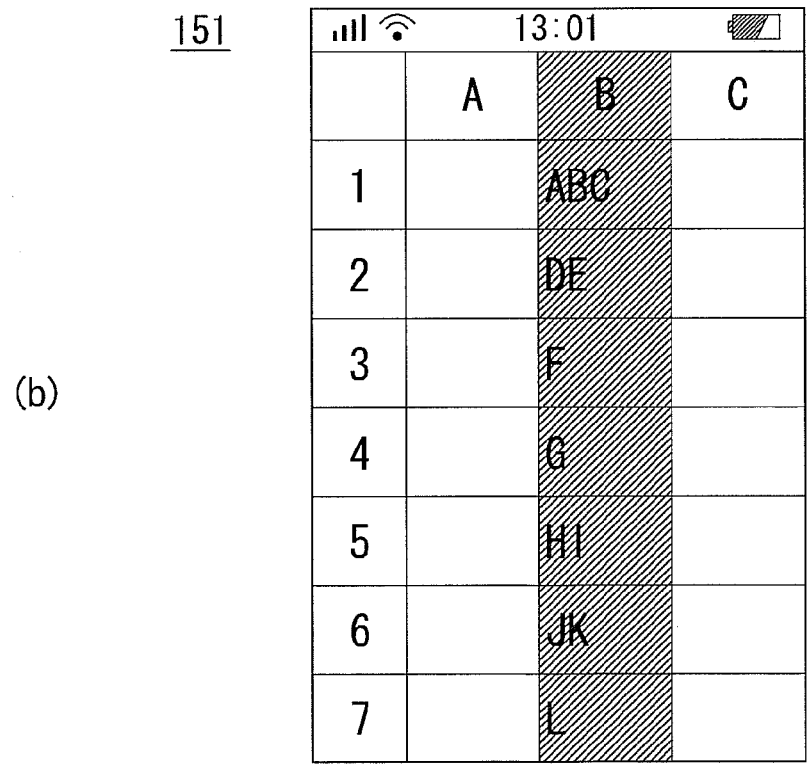

FIGS. 31 and 32 illustrate procedures of deleting and restoring a specific column in a chart in the mobile terminal of FIG. 4.

As shown in FIGS. 31 and 32, the controller 180 of the mobile terminal 100 can easily delete a specific row of a chart or easily restore the deleted column according to a touch operation of the user.

Referring to FIG. 31(a), the user can select rows A and C using the first and second fingers F1 and F2 and then perform a pinch-in touch operation on the columns A and C.

Referring to FIG. 31(b), upon the pinch-in touch operation, the controller can delete row B located between the columns A and C.

Referring to FIG. 32(a), the user select the columns A and C using the first and second fingers F1 and F2 and then perform a pinch-out touch operation.

Referring to FIG. 32(b), upon the pinch-out touch operation of the user, the controller 180 can restore the deleted column B between the columns A and C.

FIGS. 33 to 37 illustrate procedures of aligning a chart in the mobile terminal of FIG. 4.

As shown in FIGS. 33 to 37, the mobile terminal 100 can easily arrange numerical values in a chart through a simple touch operation.

Referring to FIG. 33(a), the user can select column B. The column B may be a column in the vertical direction. The user can shake the mobile terminal 100.

Referring to FIG. 33(b), the controller 180 can arrange data included in the selected column B according to size. For example, the data can be arranged in an ascending order or descending order of data size.

Referring to FIG. 34(a), the column B in the vertical direction may be selected. The user can perform a drag or flicking touch operation using the first finger F1 in the vertical direction in which the chart is displayed. For example, the user can perform a touch from the top to the bottom.

Referring to FIG. 34(b), the controller 180 can arrange data of the selected column and display the arranged data on the basis of the direction of the user touch. For example, the controller 180 can arrange the data in a descending order and display the arranged data.

The user can select an alignment method without selecting a specific row. For example, the data included in the row B can be aligned only by a touch operation of dragging or flicking the column B upward or downward.

Referring to FIG. 35(a), the user can perform a drag or flicking touch operation using the first finger F1 in the vertical direction. For example, the user can apply a touch from the bottom to the top.

Referring to FIG. 35(b), the controller 180 can align data of the selected column on the basis of the direction of the user touch. For example, the controller 180 can align the data in an ascending order and display the aligned data.

Referring to FIG. 36(a), the user can push the volume key VB while touching the column B to select the column B. For example, the user can push the key for increasing the volume or key for decreasing the volume. The controller 180 can align data differently when the key for increasing the volume is pushed and when the key for decreasing the volume is pushed.

Referring to FIG. 36(b), the controller 180 can align the selected column according to volume key push state. For example, the data included in the selected column can be aligned in a descending order when the key for increasing the volume is pushed, whereas the data can be aligned in an ascending order when the key for decreasing the volume is pushed.

Referring to FIG. 37(a), the user can select the column B using the first finger F1. After selecting the column B, the user may select the left of the selected column B with the second finger F2.

Referring to FIG. 37(b), the controller 180 can align the data included in the column B to the left according to the touch operation of the user.

Figure 38:
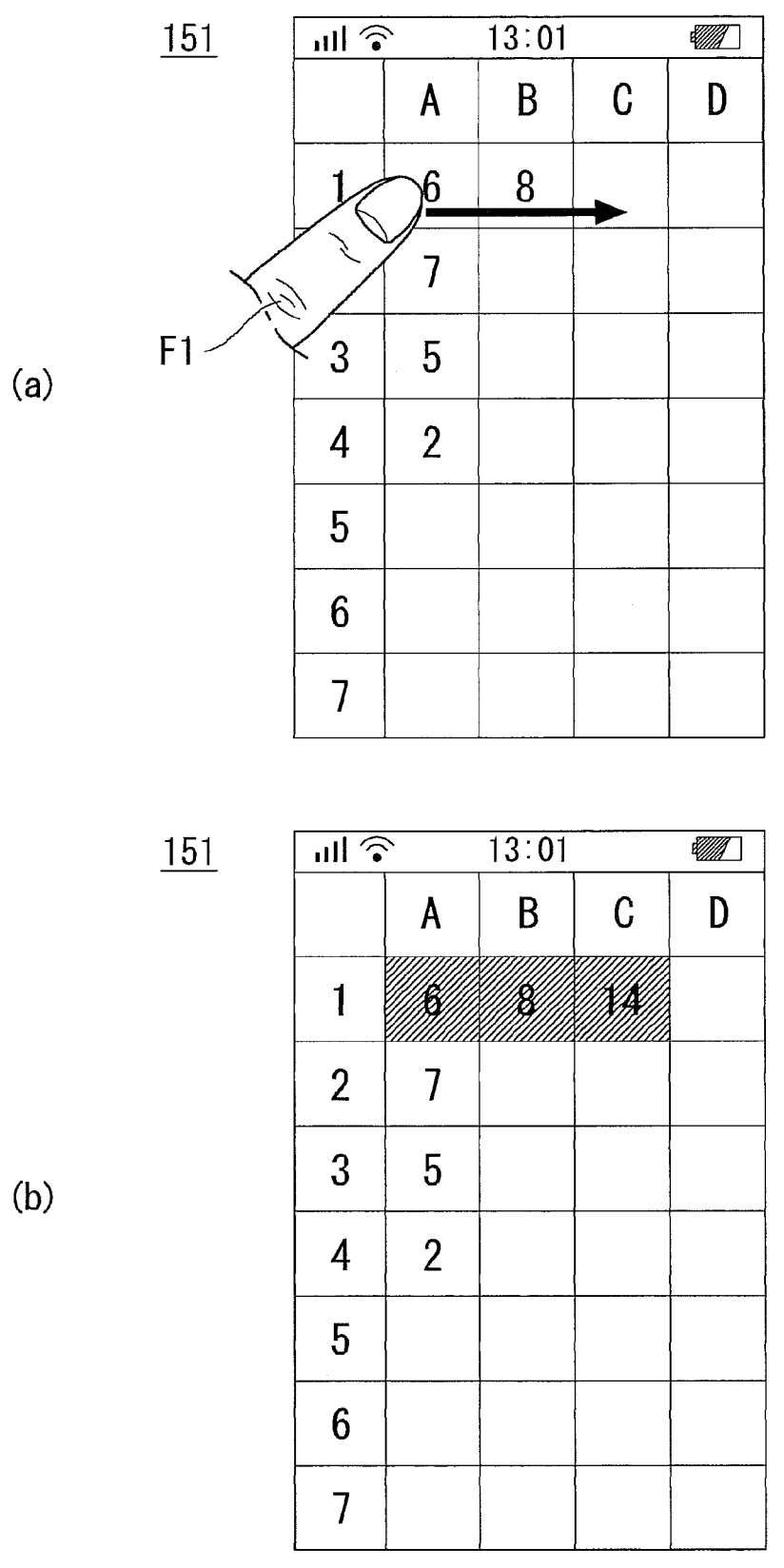
Figure 39:
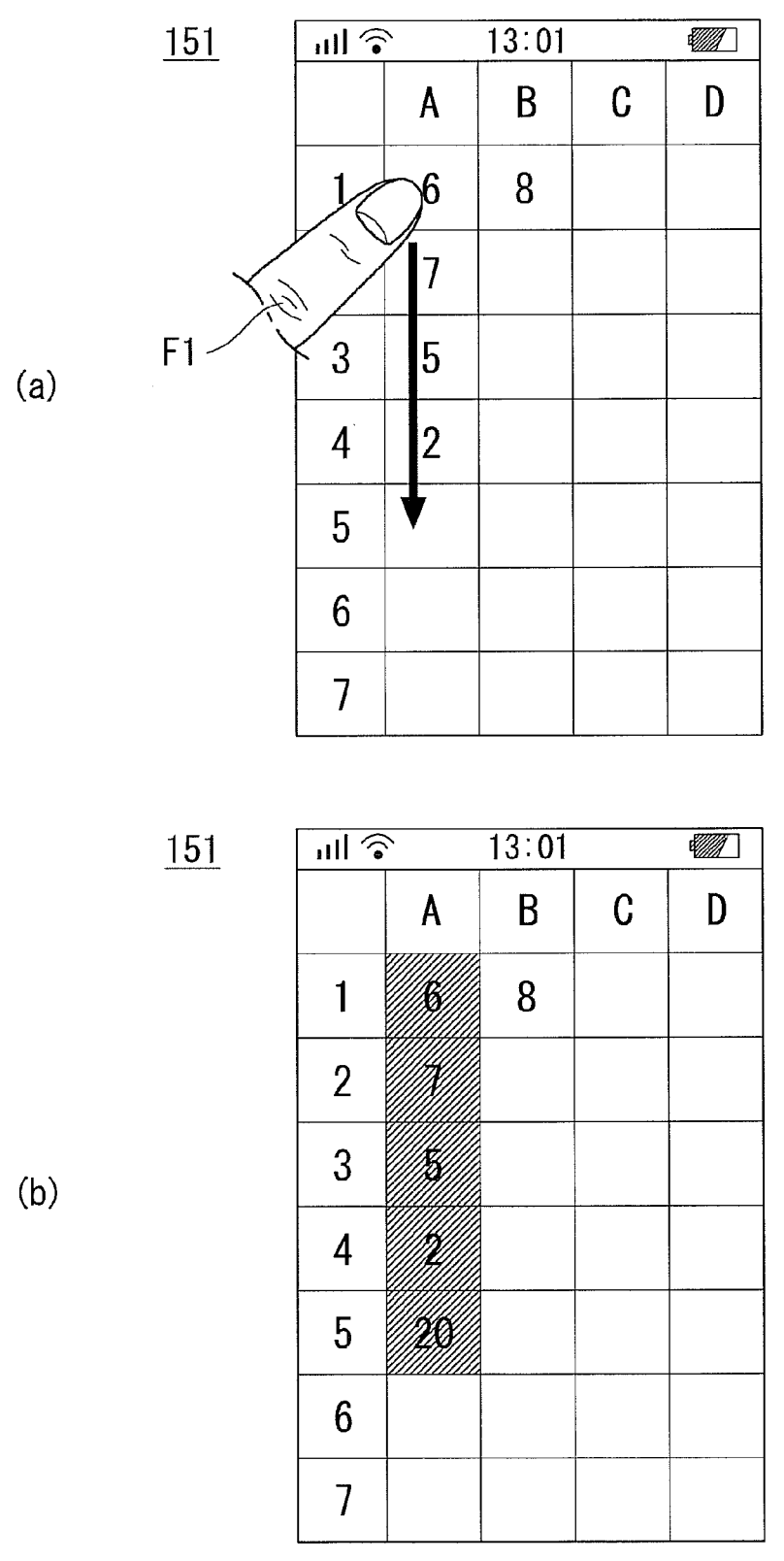

FIGS. 38 and 39 illustrate a calculation procedure using a chart in the mobile terminal of FIG. 4.

As shown in FIGS. 38 and 39, the controller 180 of the mobile terminal 100 can perform calculation of data included in a chart through a simple touch operation.

Referring to FIG. 38(a), the user can drag data included in the chart with the first finger F1 in the horizontal direction.

Referring to FIG. 38(b), upon the drag touch operation in the horizontal direction, the controller 180 can display the sum of the data corresponding to the drag touch. The sum can be displayed in a cell at which the drag is ended.

Referring to FIG. 39(a), the user can drag data included in the chart with the first finger F1 in the vertical direction.

Referring to FIG. 39(b), the controller 180 can display the sum of the data corresponding to the drag.

Figure 40:
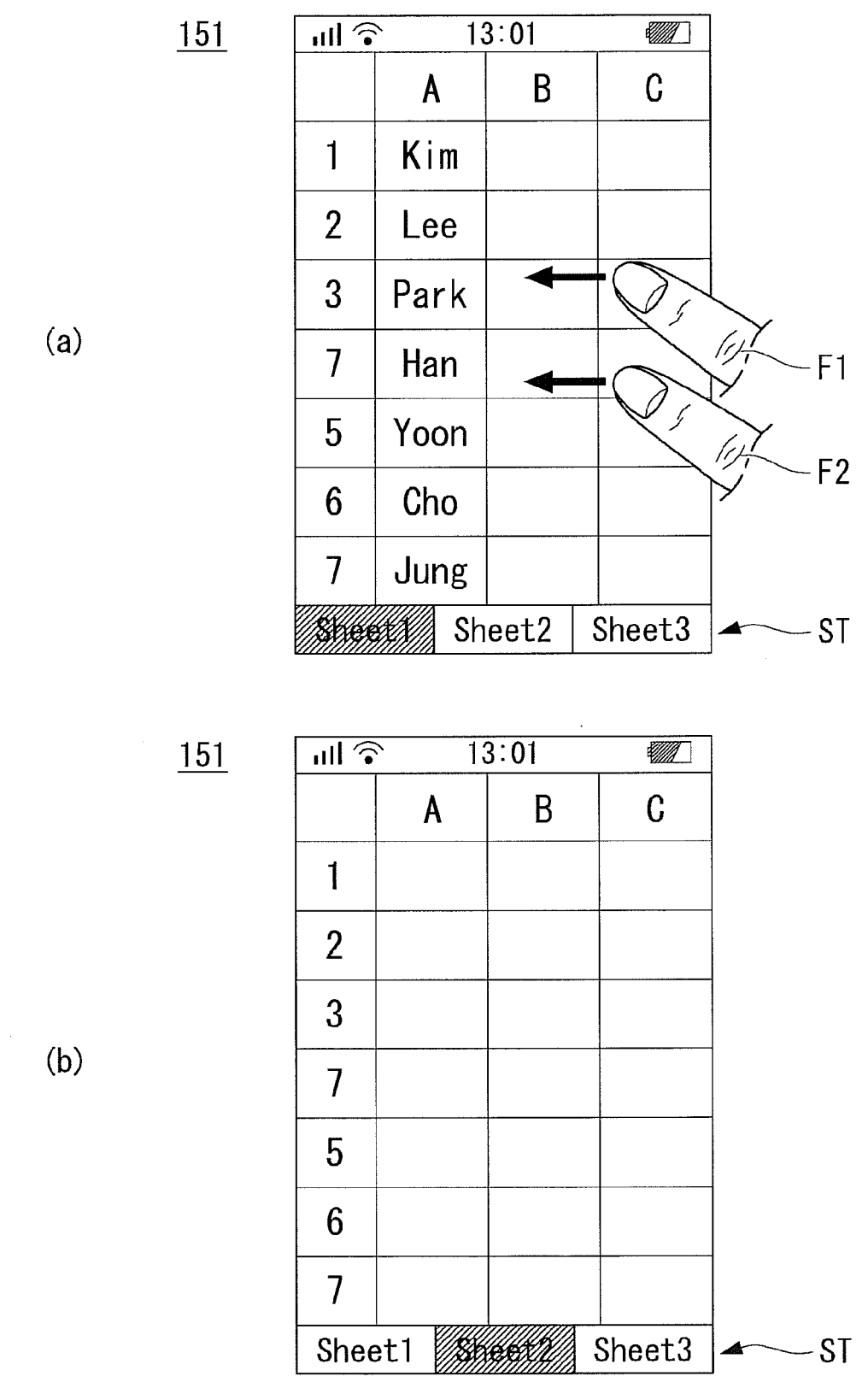

FIG. 40 illustrates a sheet moving procedure using a chart in the mobile terminal of FIG. 4.

As shown in FIG. 40, the controller 180 of the mobile terminal 100 can easily move between a plurality of sheets through a touch operation.

The sheets may include different charts. The user who performs a data work for sheet 1 may need to move to sheet 2.

Referring to FIG. 40(a), it can be known from a sheet indicator ST that three sheets currently exist. The user can perform a touch operation of simultaneously flicking the first and second fingers F1 and F2 while working on sheet 1.

Referring to FIG. 40(b), sheet 2 instead of sheet 1 can be displayed on the display 151 according to the touch operation of the user.

Figure 41:
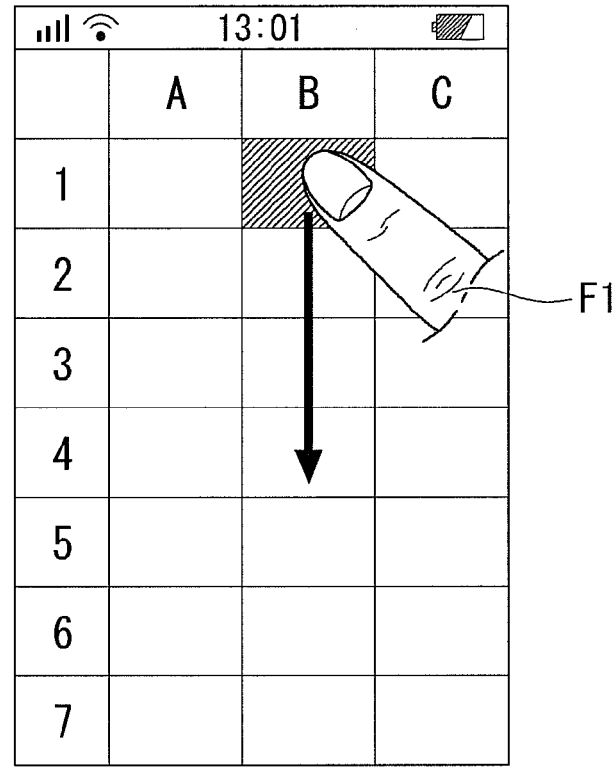
FIGS. 41 to 43 illustrate a cell merging and segmentation procedure using a chart in the mobile terminal of FIG. 4.
Figure 41:
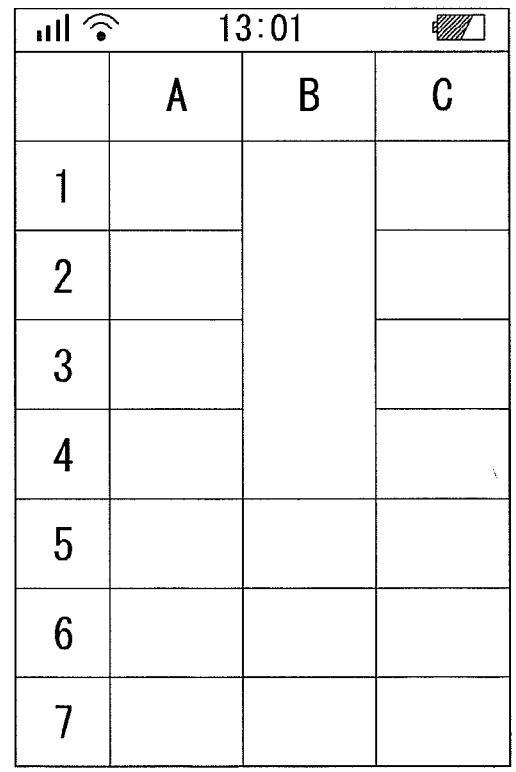
Figure 42:
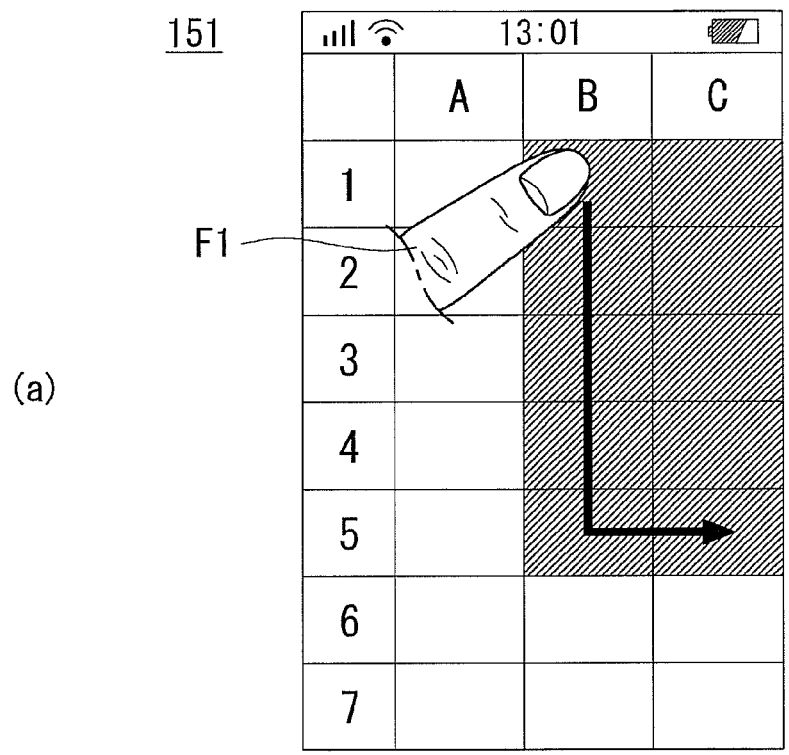
Figure 42:
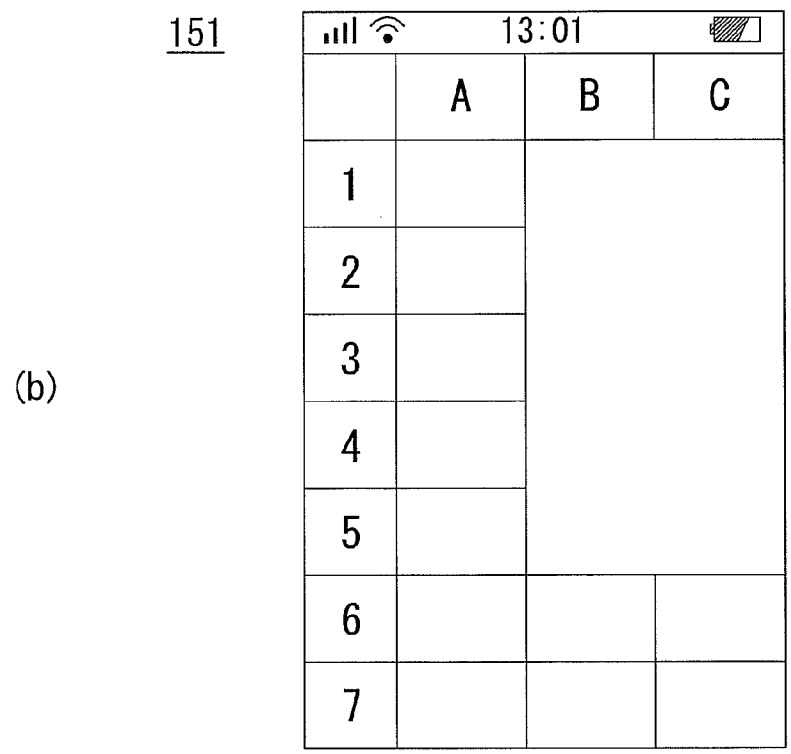
Figure 43:
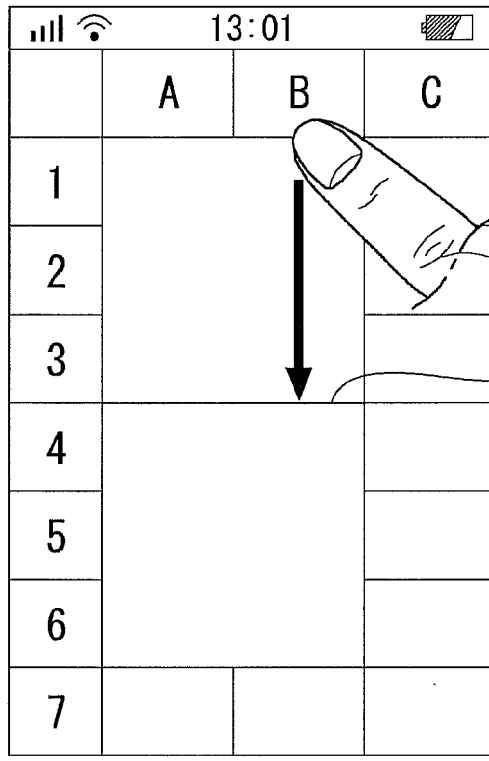
Figure 43:
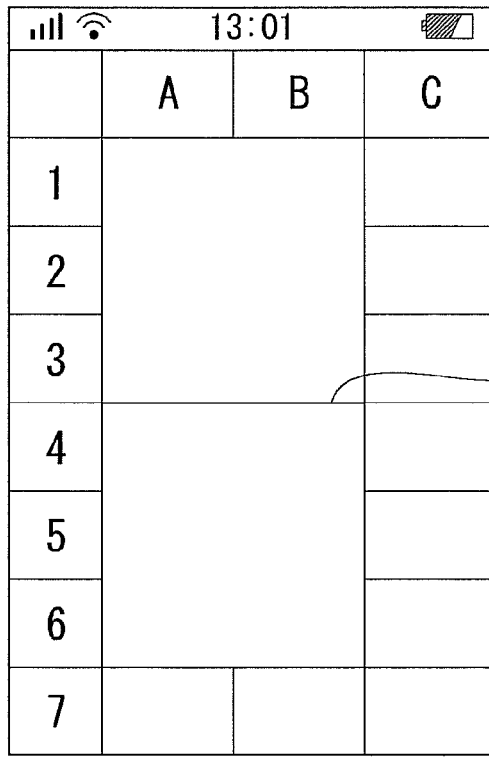

FIGS. 41 to 43 illustrate a cell merging procedure and a cell segmentation procedure using a chart in the mobile terminal of FIG. 4.

As shown in FIGS. 41 to 43, the controller 180 of the mobile terminal 100 can merge cells or segment a cell through a simple touch operation.

Referring to FIG. 41(a), the user can select a specific cell of a chart using the first finger F1 and then drag the selected cell.

Referring to FIG. 41(b), the controller 180 can merge the specific cell with other cells on the basis of the drag distance.

Referring to FIG. 42(a), the user may drag cells of the chart in the vertical direction and then drag cells of the chart in the horizontal direction using the first finger F1.

Referring to FIG. 42(b), the controller 180 can merge cells corresponding to the vertical drag operation and the horizontal drag operation.

Referring to FIG. 43(a), the user can perform a touch operation of selecting and dragging the boundary of a specific cell of the chart using the first finger F1.

Referring to FIG. 43(b), a boundary line CL can be generated at a point at which the user's drag touch is ended. That is, a merged call is segmented on the basis of the boundary line CL.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touchscreen display to display an object; and
a controller configured to determine a first touch at a first area of the touchscreen display corresponding to the object, to determine a second touch at a second area of the touchscreen display while the first touch is maintained at the first area, and to change the object displayed on the touchscreen display based at least in part on one of an attribute of the object and an attribute of the second touch,
wherein the controller is further configured to determine a third touch at a point on the touchscreen display at which the object is not displayed, and to display a text box to input a character at the point of the third touch and soft keyboard on the touchscreen display;
wherein the controller is configured to cause the touchscreen display to display a first page including a first object at a third area and a second page including a second object at a fourth area, to cause the controller to merge the first page and the second page as a merged one page in response to pinch-in touch operation on the first and second pages, and to cause the touchscreen display to display the first object and the second object in the merged one page.

2. The mobile terminal of claim 1, wherein, when one of a touch operation of selecting at least two objects from among a plurality of objects and then pinching out the at least two objects and a gesture of shaking the mobile terminal is performed, the controller cancels selection of the at least two objects.

3. The mobile terminal of claim 1, wherein the display displays one page that includes the object, and in response to receiving a pinch-in touch input operation, the controller displays a plurality of pages on the touchscreen display.

4. The mobile terminal of claim 1, wherein in response to receiving an input at a key of the mobile terminal as the second touch while the first touch is maintained, the controller executes a function corresponding to an attribute of the input key.

5. The mobile terminal of claim 4, wherein the function corresponding to the attribute of the input key corresponds to one of a function of deleting the touched object, a function of displaying a menu relating to the touched object, and a function of changing a size of the touched object.

6. The mobile terminal of claim 4, wherein the key is a touchpad or a volume key provided separately from the touchscreen display.

7. The mobile terminal of claim 1, wherein the controller changes a display form of the object based at least in part on an orientation of the mobile terminal.

8. The mobile terminal of claim 1, wherein the controller controls the mobile terminal to operate in an edit mode in which the object is handled and a view mode in which the object is not handled.

9. The mobile terminal of claim 1, wherein the controller is configured to arrange the object based on a point where the second touch is applied, wherein the controller is configured to display a guide line passing through the at least one point and arrange the at least one object along the guide line.

10. The mobile terminal of claim 1, wherein the controller is configured to display a guide line as at least one of a vertical line and a horizontal line.

11. The mobile terminal of claim 1, wherein the controller is configured to cause the touchscreen display to delete the second page displayed in the fourth area in response to touch operation of dragging or flicking the second page and to display an addition element by which a new page being added in the fourth area.

12. A method of controlling a mobile terminal, comprising:
displaying, on a display, at least one object;
receiving a first touch applied to the at least one object displayed on the display;
receiving a second touch applied to a point of the display while the first touch is maintained;
changing a display of the at least one object based at least in part on one of an attribute of the touched object and an attribute of the second touch;
arranging the at least one object based on the point where the second touch is applied;
displaying, on the display, a first page including a first object at a first area and a second page including a second object at a second area;
receiving a pinch-in touch on the first and second pages; and
in response to receiving the pinch-in touch, merging the first page and the second page as a merged one page and displaying the first object and the second object in the merged one page.

13. The method of claim 12, wherein when a third touch input is applied to a point at which the at least one object is not displayed, the method further comprises displaying, on the point of the display of the third touch, a text box to input a character.

14. The method of claim 12, wherein when an input of a key of the mobile terminal is received while the first touch is maintained, the method further comprises executing a function corresponding to an attribute of the inputted key.

15. The method of claim 12, wherein changing the display includes changing a display form of the at least one object based at least in part on an orientation of the mobile terminal.

16. The method of claim 12, further comprising controlling the mobile terminal in one of an edit mode in which the at least one object is handled and a view mode in which the at least one object is not handled.

17. The method of claim 12, further comprising:
receiving a touch operation of dragging or flicking the second page, and
in response to receiving the touch operation, deleting the second page displayed in the second area and displaying an additional element by which a new page is added to the second area.

18. A mobile terminal comprising:
a touchscreen display; and
a controller configured to:
- cause the touchscreen display to a first page including a first object at a first area and a second page including a second object at a second area, and
- cause the controller to merge the first page and the second page in response to pinch-in touch operation on the first and second pages, and cause the touchscreen display to display the first object and the second object in the merged one page.

19. The mobile terminal of claim 18, wherein the controller is further configured to cause the touchscreen display to delete the second page displayed in the second area in response to touch operation of dragging or flicking the second page and to display an addition element by which a new page being added in the second area.

* * * * *